US010457100B2

United States Patent
Bateman, Jr. et al.

(10) Patent No.: US 10,457,100 B2
(45) Date of Patent: Oct. 29, 2019

(54) CART WHEEL ASSEMBLY WITH REPLACEABLE TIRE

(71) Applicant: gowheels, Inc., Raleigh, NC (US)

(72) Inventors: William J. Bateman, Jr., Raleigh, NC (US); Kevin J. Rackers, Summerfield, NC (US); Nathan J. Rackers, Summerfield, NC (US); Sean Joseph Rayna, Thomasville, NC (US)

(73) Assignee: gowheels, Inc., Raleigh, NC (US)

( * ) Notice: Subject to any disclaimer, the term of this patent is extended or adjusted under 35 U.S.C. 154(b) by 0 days.

(21) Appl. No.: 16/053,346

(22) Filed: Aug. 2, 2018

(65) Prior Publication Data

US 2019/0030955 A1    Jan. 31, 2019

Related U.S. Application Data

(63) Continuation of application No. PCT/US2018/043981, filed on Jul. 26, 2018.

(60) Provisional application No. 62/537,403, filed on Jul. 26, 2017.

(51) Int. Cl.
*B60C 7/24* (2006.01)
*B60B 33/00* (2006.01)
*B60C 7/08* (2006.01)
*B60C 7/00* (2006.01)

(52) U.S. Cl.
CPC ............ *B60C 7/24* (2013.01); *B60B 33/0039* (2013.01); *B60C 7/08* (2013.01); *B60B 2200/432* (2013.01); *B60B 2900/521* (2013.01); *B60B 2900/541* (2013.01); *B60C 2007/005* (2013.01); *B60C 2200/00* (2013.01)

(58) Field of Classification Search
CPC ......... B60C 15/0226; B60C 7/24; B60C 7/26; B60C 3/00; A63C 17/22; A63C 17/223
See application file for complete search history.

(56) References Cited

U.S. PATENT DOCUMENTS 5,060,706 A * 10/1991 Jones .................... B60C 15/028
                                                           152/379.3
5,460,433 A    10/1995 Hawley
6,880,833 B2    4/2005 Polanco
(Continued)

FOREIGN PATENT DOCUMENTS

EP    2845748 B1    3/2013

OTHER PUBLICATIONS

Hwang, Chan Yoon, Patent Cooperation Treaty—International Search Report for International Application No. PCT/US2018/043981 (priority document for present application), dated Nov. 13, 2018, 5 pages, Korean Intellectual Property Office, Daejeon, South Korea.

(Continued)

*Primary Examiner* — Jason R Bellinger
(74) *Attorney, Agent, or Firm* — Kevin E Flynn; Flynn IP Law

(57) ABSTRACT

The disclosure addresses a series of interactions between wheels and a number of different replaceable tire segments to cover the wheels. The disclosure teaches more than one way to engage the one or more tire segments to wheels and to form seams between ends of the one or more tire segments. The tire segments may be removed and replaced so that the wheels and wheel bearing may be used longer than the useful life of the tire segments.

20 Claims, 18 Drawing Sheets

(56) References Cited

U.S. PATENT DOCUMENTS

| | | | |
|---|---|---|---|
| 7,334,617 | B2 | 2/2008 | Hill, III et al. |
| 7,640,996 | B2 | 1/2010 | Moyna |
| 7,726,370 | B2 | 6/2010 | Sauerwald et al. |
| 7,878,600 | B2 | 2/2011 | Krantz |
| 8,578,984 | B2 * | 11/2013 | Hannah .................. B60B 23/10 152/176 |
| 9,090,121 | B2 | 7/2015 | Korus et al. |
| 9,821,601 | B2 | 11/2017 | Korus et al. |
| 2007/0063573 | A1 | 3/2007 | Szabo et al. |
| 2007/0240800 | A1 | 10/2007 | Sauerwald et al. |
| 2009/0095496 | A1 | 4/2009 | Moyna |
| 2013/0284860 | A1 | 10/2013 | Korus et al. |
| 2015/0083295 | A1 * | 3/2015 | Resa Rodrigo ........... B60C 7/10 152/306 |
| 2016/0075176 | A1 | 3/2016 | Solheim et al. |
| 2016/0200143 | A1 | 7/2016 | Korus et al. |

OTHER PUBLICATIONS

Hwang, Chan Yoon, Patent Cooperation Treaty—Written Opion of the International Searching Authority for International Application No. PCT/US2018/043981 (priority document for present application), dated Nov. 13, 2018, 14 pages, Korean Intellectual Property Office, Daejeon, South Korea.

Mitchell, Jared, Hard Life for Shopping Carts, Evolution—Business and Technology from SKF, screen prints from article found at http://evolution.skf.com/us/hard-life-for-shopping-carts/, Feb. 15, 1998, 2 pages, AB SKF, Gothenburg, Sweeden.

\* cited by examiner

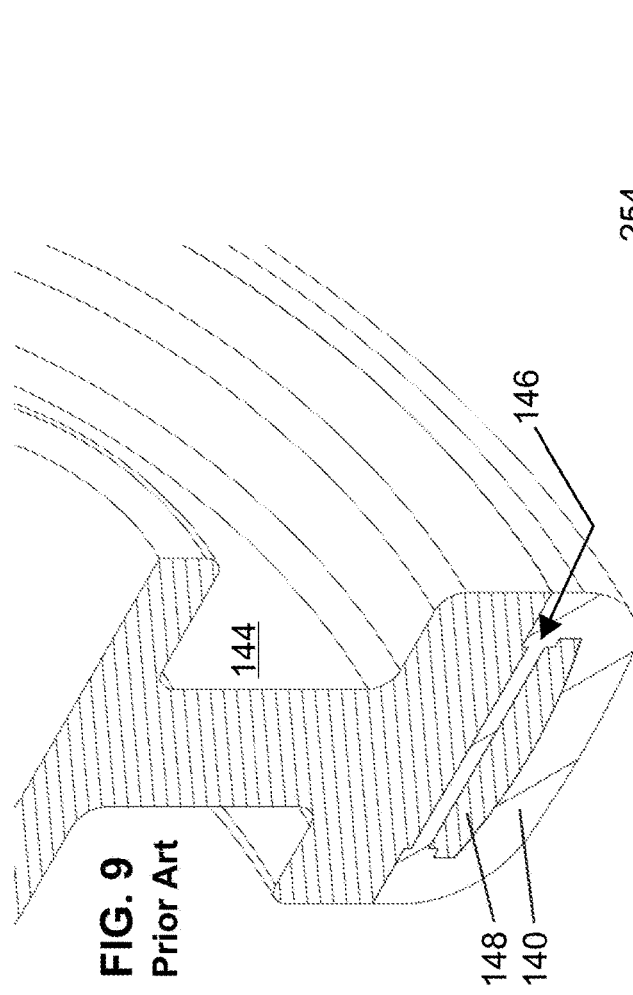
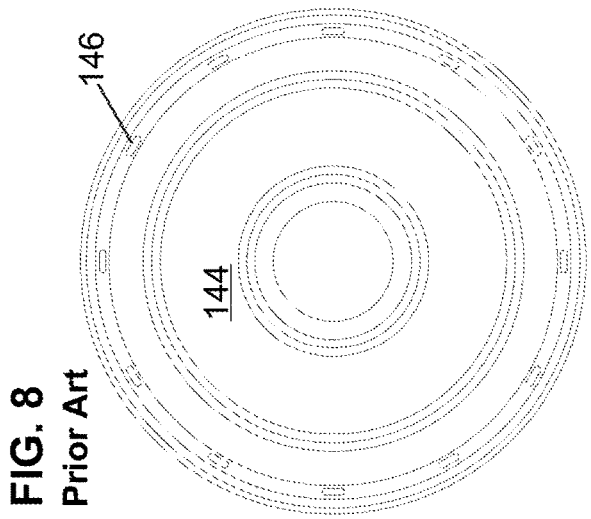
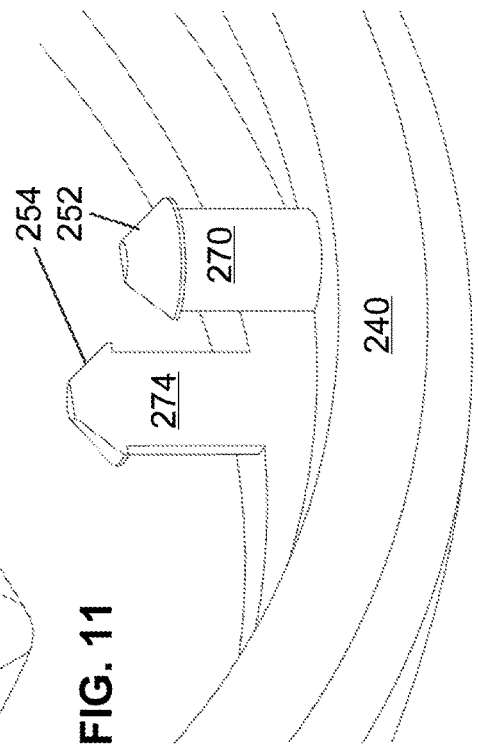
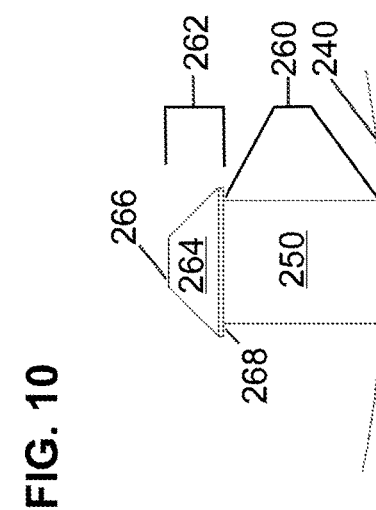

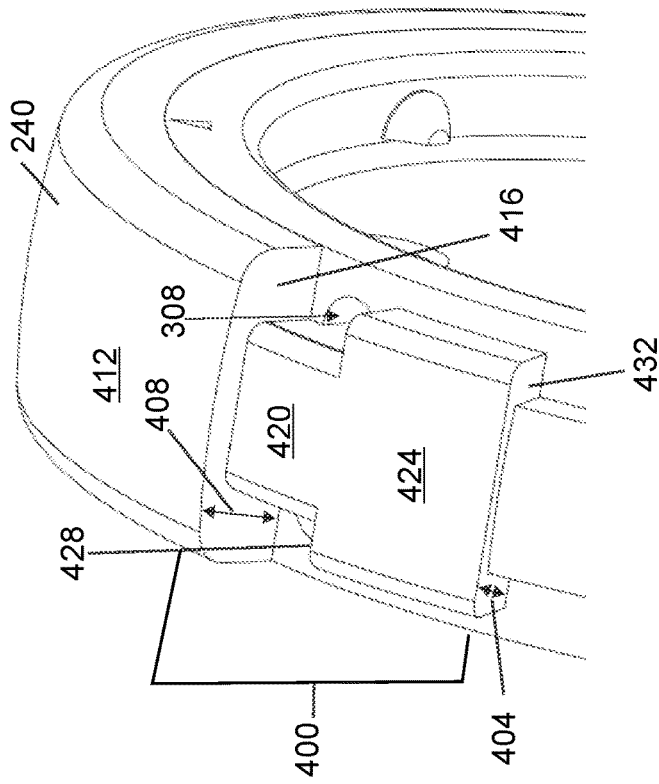
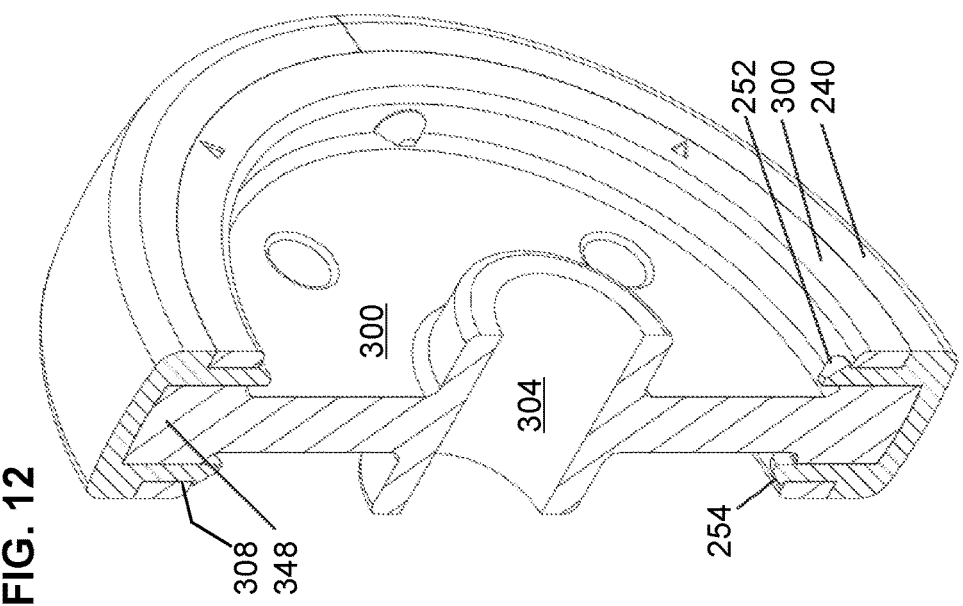

110

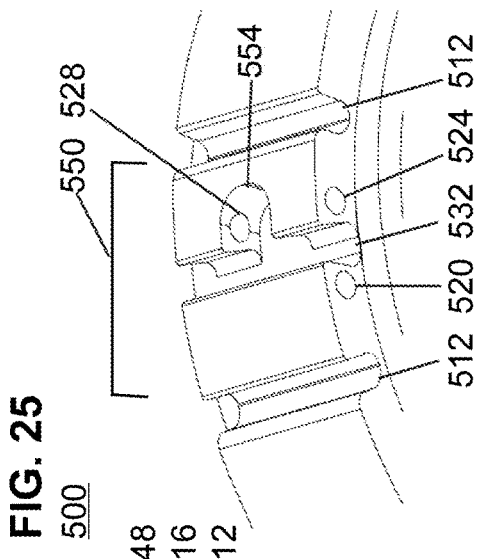
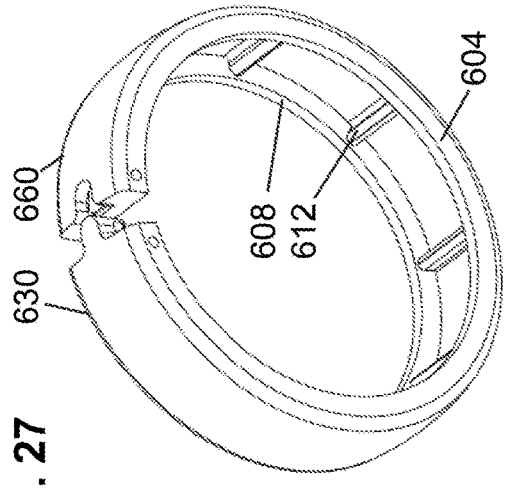
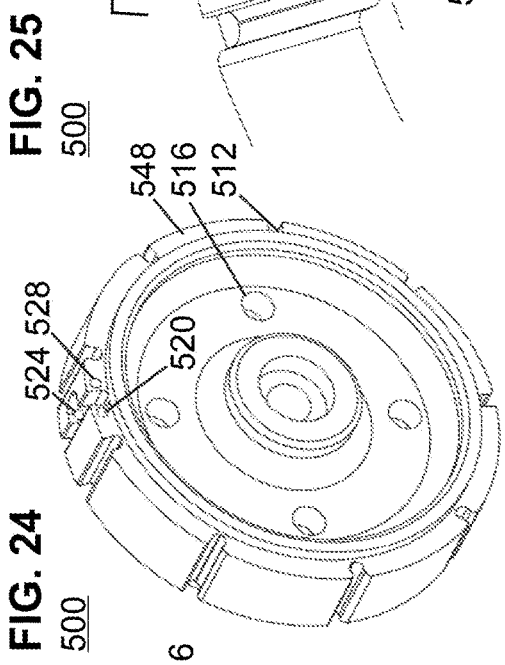
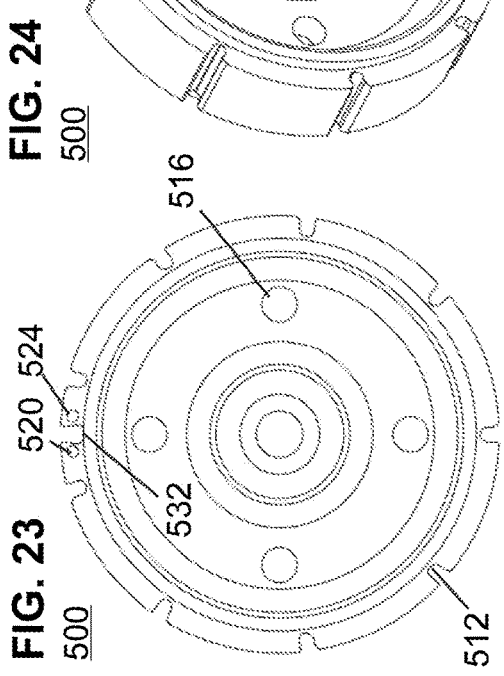
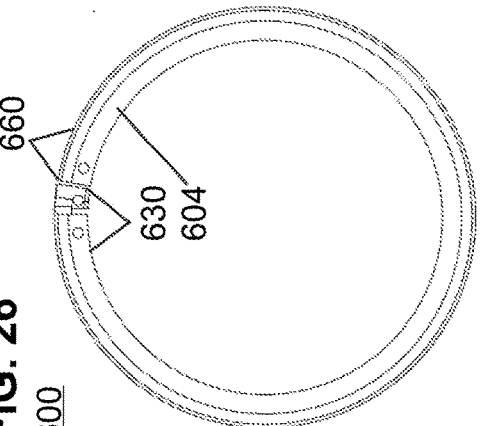

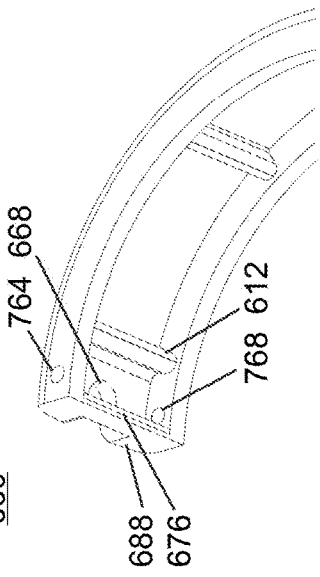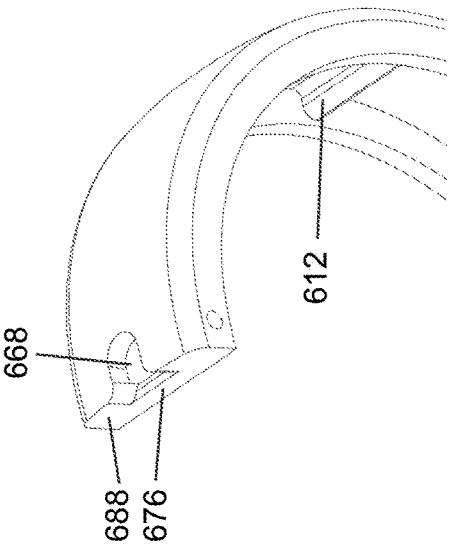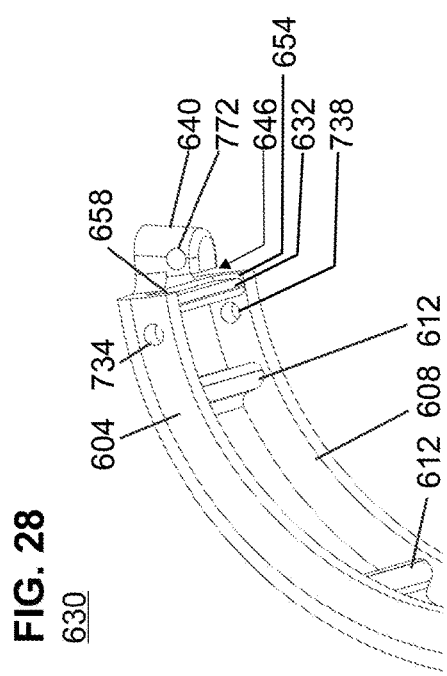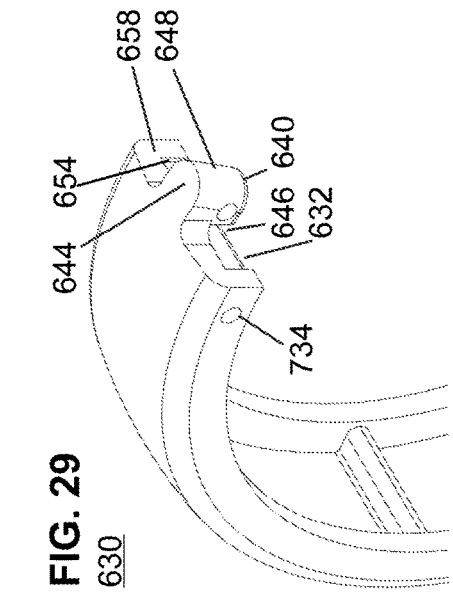

600

500

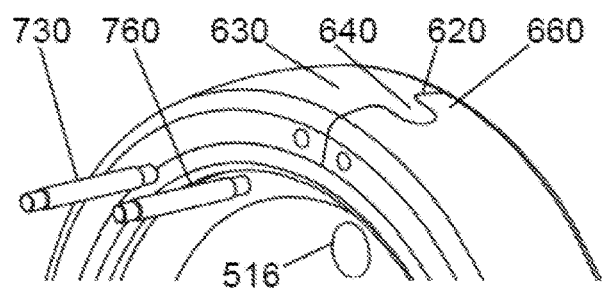
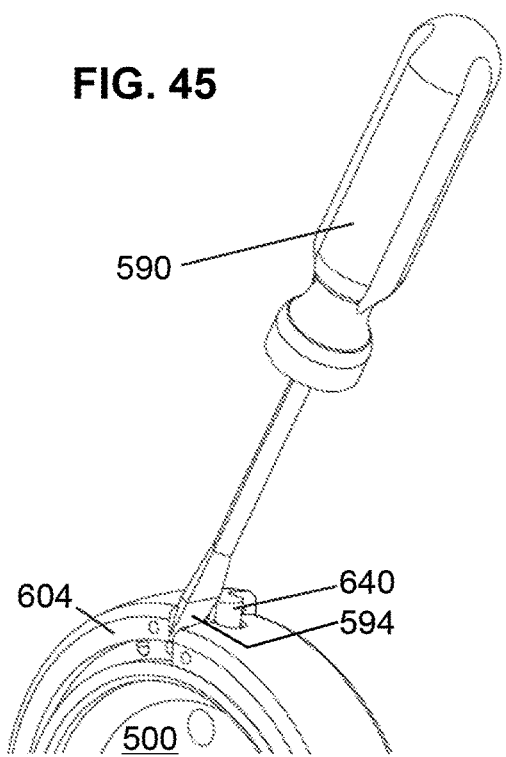
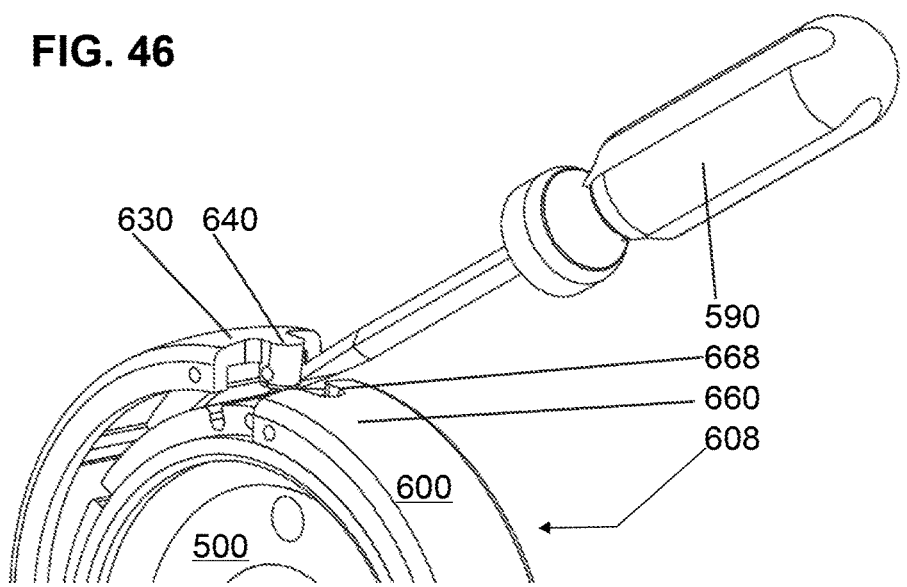

900

930

1660

1630

CART WHEEL ASSEMBLY WITH REPLACEABLE TIRE

This application claims priority to and incorporates by reference commonly assigned Patent Cooperation Treaty Patent Application No. PCT/US18/43981 filed Jul. 26, 2018 for Cart Wheel Assembly with Replaceable Tire. This application claims through the '981 application the benefit of U.S. Provisional Application No. 62/537,403 filed Jul. 26, 2017 for Shopping Cart Wheel Assembly with Replaceable Tire.

BACKGROUND

Field of the Disclosure

This disclosure relates generally to wheels including wheels for carts, including shopping carts of all types that are used by customers in retail stores. The teachings of the disclosure may be applied to other wheels using non-pneumatic tires.

Related Art

FIG. 1 introduces a wheel from a shopping cart. The wheel assembly 100 is connected to a caster assembly 130 by a nut 138 and bolt 134 where the bolt 134 runs through the center of a hub and bearing assembly 120. The wheel assembly 100 includes a wheel 144 and a tire 140 that rotate relative to the bolt 134 as there is a bearing (not shown) that allows for this relative motion. Frequently there is a sleeve bearing as that type of bearing is of lesser cost than a ball bearing.

There are many different shopping carts used in various retail environments. Many carts have a wire basket for the receipt of goods. Some carts such as those used in hardware stores or bulk item stores such as a Costco® store are large flat carts. There are other more specialized carts, particularly in hardware stores, that are adapted for receipt of lumber, drywall, or other common construction items. Many stores have carts that include places for children to sit including carts that have been made to resemble vehicles or other shapes to amuse the child occupants.

Shopping carts of the wire basket type vary considerably in the size and expected loading. Some carts used in clothing stores or a pharmacy are relatively small in order to get through small aisle cross sections and around displays. These smaller carts typically have lower expectations for loading. Grocery store carts are very common and have larger capacities and loading expectations. There are still larger basket type carts for warehouse stores that sell larger items or items in bulk.

Carts typically have at least some caster assemblies 130 with a bearing 136 to allow for rotation of the wheel assembly 100 to allow for a change of direction of the cart. Some carts have two wheel assemblies that are not free to change direction and two wheel assemblies that are free to change direction. Other carts have all wheel assemblies capable of changing direction.

Problem with Prior Art Solutions

Unlike a cart used by employees in an industrial setting, stores place a premium on having a "quiet ride" for their retail carts. They do not want customers to be annoyed by the noise and vibration of a wheel assembly on a cart the customer is pushing or to hear the noise from a wheel assembly on a cart nearby that is being pushed by another customer.

One way to provide for a quiet ride is to choose a relatively soft material for the tire. Prior art tires for shopping cart wheel assemblies were frequently made from thermoplastic polyurethane (TPU). Per Wikipedia (en.wikipedia.org/wiki/Thermoplastic_polyurethane), TPU has properties that make it a reasonable choice for this use as TPU has elasticity and resistance to oil, grease, and abrasion. TPU is a mixture of hard and soft segments in a block copolymer and thus can be tuned to a particular desired hardness.

Eventually the TPU tire becomes imperfect and becomes annoying to shoppers. The defect may be a flat spot or a gouge where there is now a discontinuity in the tire surface. Either way, the rotation of the tire will produce a sound and vibration each time the flat spot or gouge rotates to come in contact with the floor.

One estimate of the useful life of a shopping cart tire is only two years. Due to the way the prior art tires were attached to the prior art wheels, the entire wheel assembly 100 including: tire 140, wheel 144, and the hub and bearing assembly 120 were discarded. This discard all design leads to a preference for using the least expensive bearing as it is a disposable part. The aggregate disposal of wheel assemblies 100 adds greatly to the volume of material in landfills. Disposing of the undamaged wheel 144 and the undamaged hub and bearing assembly 120 because of the early failure of the tire is unfortunate and raises the cost of operation of shopping carts. Given that there are millions of shopping carts in just the United States, the volume of discarded wheel assemblies 100 from carts is massive.

Loading Constraints.

There are three main loading conditions for the tire 140 (See FIG. 1). The first is the vertical load that tends to flatten the tire. The second is the rolling direction load that is minimized as long as the hub and bearing assembly 120 are not seized and wheel assembly 100 is allowed to roll. The third loading direction is the side load condition and is the one that is most important to the design. The following is a description of how this side load impacts the design. This description starts with an examination of the robust, but non replaceable tire design of the prior art to highlight the challenge of creating a replaceable tire that will perform as well as the non-replaceable prior art tire 140.

First Example

FIG. 2 shows a perspective view of a tire 140 that lies on a wheel 144. FIG. 3 shows a cross section of the tire 140 and wheel 144 showing the simple arrangement of the tire 140 along the perimeter of the wheel 144.

Response to Lateral Force.

FIG. 4 shows a cross section of the lower portion of the tire 140 and wheel 144 from FIG. 2 and FIG. 3. If someone drove one shopping cart into the side of another shopping cart, the struck cart would have a lateral force 184 to move the cart and the attached wheel sideways. The portion of the tire 140 in contact with the ground 188 would resist moving sideways because of the friction force 180 and the tire 140 may be separated from the wheel 144. The problem is particularly acute for a wheel assembly 100 that is not able to change orientation with respect to the cart which is frequently true for two of the four wheel assemblies.

More specifically, if the tire 140 is experiencing a vertical normal force (N) due to the weight of a cart and the contents of the cart, there will be a friction force ($F_f$) 180 that is proportional to the normal force and the coefficient of friction between the tire 140 and the ground (u). The relationship can be expressed as $F_f=N*u$. The combination of the Applied Load ($F_A$) (lateral force 184) on the wheel 144 and the equal and opposite friction force $F_f$ 180 will tend to make the tire 140 separate from the wheel 144.

The sideward force may not come from a cart collision. It could come from a user trying to slide the cart sideways to change directions in tight quarters. Or the sideways force may come when a store employee is moving a long train of shopping carts back into the store and needs to move the end of the train of carts closest to the employee sideways to allow the train of carts to navigate back into the store. Thus, wheel 144 will experience lateral forces with some frequency, even if the cart is not hit in the side by another cart.

A Second Example

FIG. 5 shows a cross section of a portion of a wheel 144 and tire 140 with a first order solution to make the tire 140 less likely to be separated from the wheel 144. The wheel 144 has added geometry to the wheel 144 which is a wheel center ridge 148. The tire 140 will have a mating groove to receive the wheel center ridge 148.

In FIG. 6 the lateral force 184 is applied to the wheel 144 through the cart (not shown here). A reaction to the ground 188 provides a friction force 180 which tends to cause the tire 140 to separate from the wheel 144.

The wheel center ridge 148 prevents the tire 140 from sliding off as discussed in connection with FIG. 4. However, due to the way the tire 140 deforms as it drags on the ground as the cart moves laterally, the tire 140 on the opposite side of the lateral force 184 will separate from the wheel 144. This may be called roll-out separation. Given adequate lateral force 184 and coefficient of friction between the tire 140 and the ground (u), the roll-out separation may be severe enough to pull the tire 140 so that it does not reseat when the application of lateral force stops.

FIG. 7 shows a wheel 144 and tire 140 with a more complex wheel center ridge 148. However, even the wheel 144 and tire 140 may suffer from roll-out separation under severe lateral forces.

Through Openings.

FIG. 8 shows a front view of a wheel 144 with a prior art solution to this problem. In addition to the more complex wheel center ridge 148 (See FIG. 9), the wheel 144 has a series of through holes 146. A tire 140 can be molded onto the wheel 144 so that the tire material passes through the through holes 146 in the wheel 144 and thus engages the tire 140 to the wheel 144 so that the tire 140 is not peeled off during incidents of significant lateral forces on the wheel assembly 100.

FIG. 9 shows cross section in perspective view that shows a wheel 144 with engaged tire 140 that extends through the through holes 146 in the wheel 144. Tires 140 that have material that passes through openings in the wheel 144 are the current prior art solution to creating durable wheel assemblies for carts as shown in FIG. 1 discussed above. However, this wheel assembly 100 design requires the tire material to be molded in place on the wheel so that the tire material can pass through the through holes 146 in the wheel 144. This molding process can only be effectively accomplished at a manufacturer's facility and is not an option for providing replacement tires.

Vocabulary.

Unless explicit to the contrary, the word "or" should be interpreted as an inclusive or rather than an exclusive or. Thus, the default meaning of or should be the same as the more awkward and/or.

Unless explicit to the contrary, the word "set" should be interpreted as a group of one or more items.

Within this disclosure the terms radially outward or radially inward should be interpreted as moving in a way that increases or decreases the distance to the center of the wheel or other relevant object. Is not necessary that the movement be precisely aligned with a particular radius of the wheel as long as one of skill in the art would be able to discern whether the motion was largely moving towards or away from the center of the object.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

SUMMARY OF THE DISCLOSURE

Some of the aspects of the teachings of the present disclosure may be summarized as a method of applying a tire to a wheel. The method including forming a tire seam with:
   a first seam end having at least one locking finger that extends beyond a first seam face, the first seam end having a first seam end first sidewall and a first seam end second sidewall that cover a least a portion of a center ridge that extends along at least a portion of a circumference of the wheel; and
   a second seam end having at least one opening to receive a locking finger behind a second seam face, the second seam end having a second seam end first sidewall and a second seam end second sidewall that cover a least a portion of the center ridge that extends along at least a portion of the circumference of the wheel.

The method including inserting the at least one locking finger into the at least one opening to draw the first seam face to the second seam face; and after inserting the at least one locking finger into the at least one opening to draw the first seam face to the second seam face, inserting a finger locking pin to engage a passageway in the second seam end first sidewall, a passageway in the second seam end second sidewall, a passageway through a portion of the locking finger, and at least one passageway through the wheel.

A variation on this teaching is to use a finger locking pin but not engage the wheel with the finger locking pin.

Some of the aspects of the teachings of the present disclosure may be summarized as a method of disengaging a seam at a joint between two tire ends for a tire covering a wheel. The method includes pressing on a first end of a first locking pin at a first tire sidewall to force a second end of the first locking pin to extend outward from a second tire sidewall, then removing the first locking pin from engagement with a wheel so that a second seam end is no longer engaged with the wheel by the first locking pin; and disengaging a locking finger extending from a first seam end from an opening in the second seam end such that the first seam end is disengaged from the second seam end.

Some of the aspects of the teachings of the present disclosure may be summarized as a creating an assembly made from a wheel with a tire on the wheel. The wheel having a set of locking grooves to receive locking ribs from a tire segment. The tire segment with a first end and a second end, the first end and the second end adapted to form a tire seam. The tire segment having a spacing of a pair of locking ribs on the tire segment relative to a spacing of a pair of locking grooves on the wheel causing a portion of the tire segment to become elongated in order to place a first locking rib in a first locking groove and second locking rib in a second locking groove adjacent to the first locking groove.

Some of the aspects of the teachings of the present disclosure may be summarized as a method of applying a tire segment to a wheel by placing a tire segment around at least a portion of a wheel such that sidewalls of the tire segment cover at least a portion of a center ridge on at least a portion of the portion of the wheel. The method includes placing at least a portion of a tire joint section of a second type over at least a portion of a tire joint section of a first type to form an overlapped joint and engaging at least one passageway through the wheel so that the overlapping joint is bound to the wheel.

Other aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 8 shows a front view of a wheel 144 with a prior art solution to this problem.

FIG. 9 shows cross section in perspective view that shows a wheel 144 with engaged tire 140 that extends through the through holes 146 in the wheel 144.

FIG. 10 shows a side view of a half-rivet 250.

FIG. 11 shows a perspective view showing the outward surface 270 of one half-rivet 252 and the flat inside face 274 of the half-rivet 254 on the opposite side of the wheel.

FIG. 12 shows cross section of a tire 240 mounted on wheel 300.

FIG. 13 introduces a T-tongue part of the tire joint.

FIG. 23 shows a front view of a wheel 500.

FIG. 24 shows a front-top-left side perspective view of the wheel 500 from FIG. 23.

FIG. 25 is a top-front perspective view of a portion of wheel 500 which shows joint portion 550 of the wheel with joint groove 532 and an enlarged view of the male pin bore 520 and first locking pin bore 524 and second locking pin bore 528.

FIG. 26 shows a front view of tire 600.

FIG. 27 shows a front-top-left side perspective view of the tire 600 from FIG. 26.

FIG. 28 provides an upward-front perspective view looking up into the male portion 630 of tire 600.

FIG. 29 provides a downward-front perspective view looking onto the top surface of the male portion 630 of tire 600.

FIG. 30 provides an upward-front perspective view looking up into the female portion 660 of tire 600.

FIG. 31 provides a downward-front perspective view looking onto the top surface of the female portion 660 of tire 600.

FIG. 44 shows that the first step is to remove the locking pins 730 and 760.

FIG. 45 illustrates the insertion of a distal end 594 of a tool 590 such as an appropriate size flathead screwdriver into the seam 620 between the male portion 630 and the female portion 660 of the tire 600.

FIG. 46 illustrates a continuation of the process as the distal end 594 of the tool 590 is moved between the locking finger 640 and the second sidewall 608. The process may continue for several iterations until the locking finger 640 is out of the opening 668 in the female portion 660.

DETAILED DESCRIPTION

Figure 1:
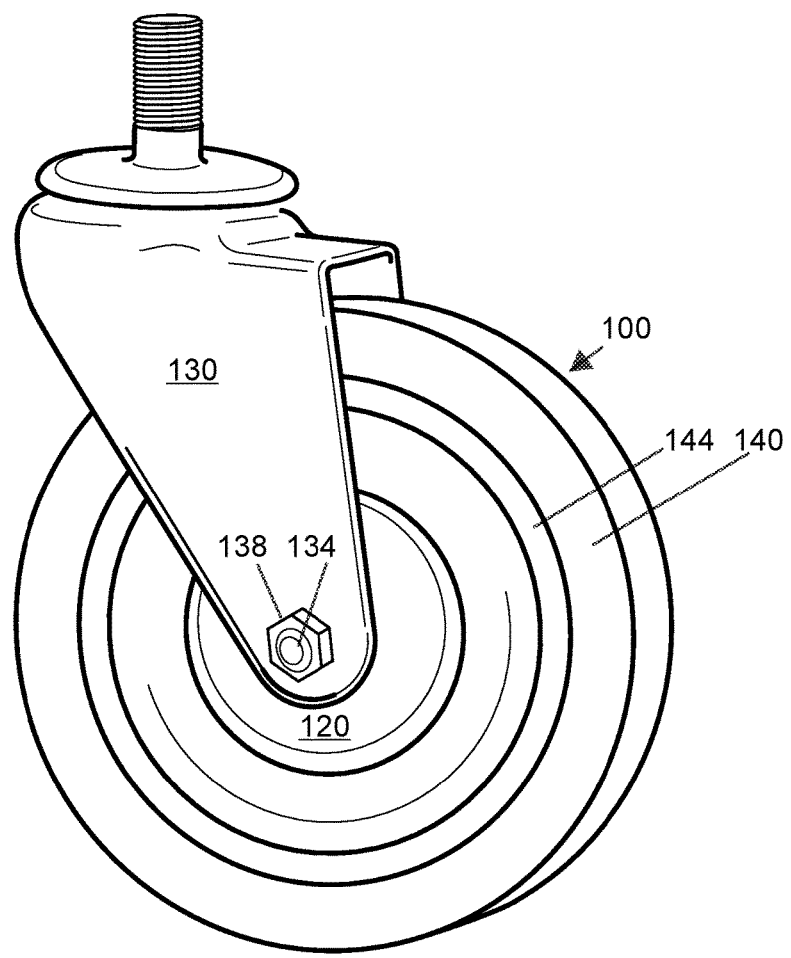
FIG. 1 introduces a wheel from a shopping cart.
Figure 2:
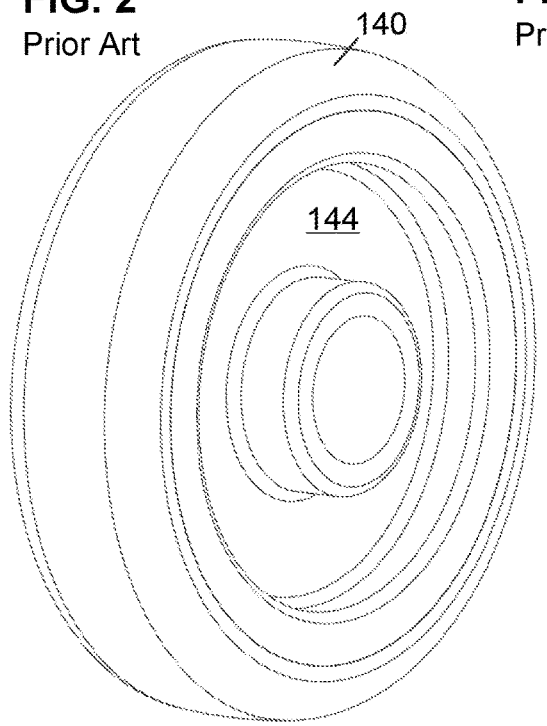
FIG. 2 shows a perspective view of a tire 140 that lies on a wheel 144
Figure 3:
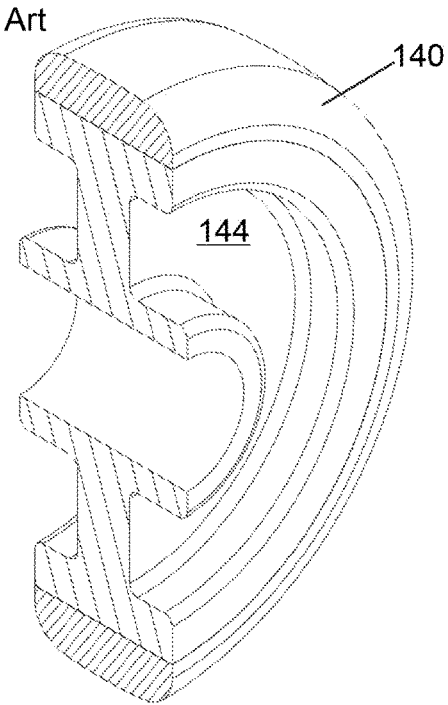
FIG. 3 shows a cross section of the tire 140 and wheel 144 showing the simple arrangement of the tire 140 along the perimeter of the wheel 144.
Figure 4:
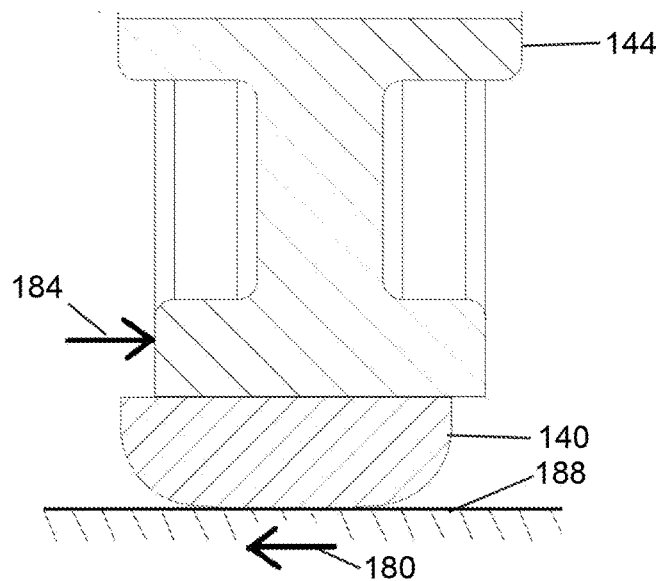
FIG. 4 shows a cross section of the lower portion of the tire 140 and wheel 144 from FIG. 2 and FIG. 3.
Figure 5:
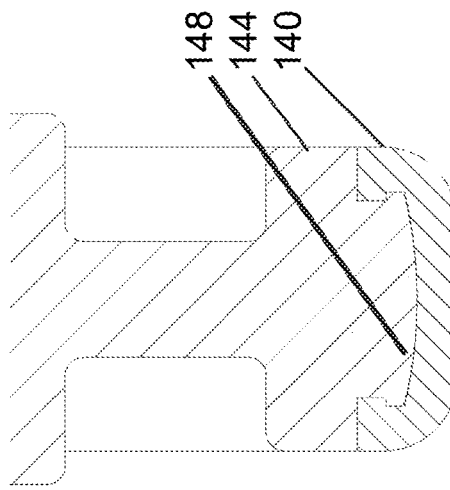
FIG. 5 shows a cross section of a portion of a wheel 144 and tire 140 with a first order solution to make the tire 140 less likely to be separated from the wheel 144.
Figure 6:
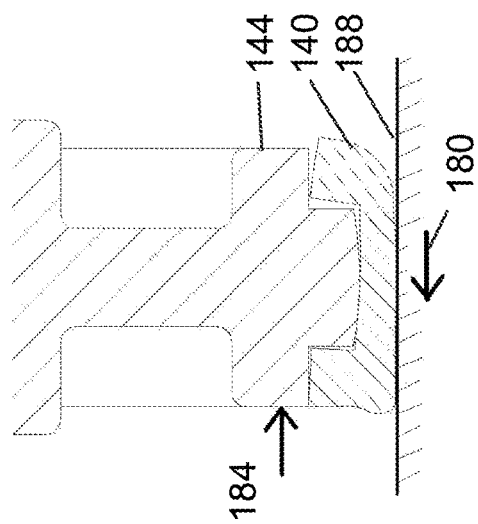
FIG. 6 shows the lateral force 184 is applied to the wheel 144 through the cart.
Figure 7:
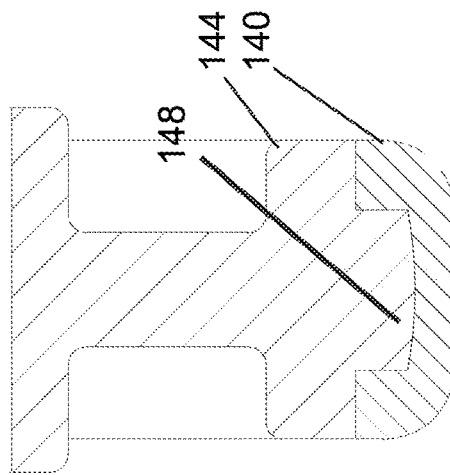
FIG. 7 shows a wheel 144 and tire 140 with a more complex wheel center ridge 148.

An improved wheel assembly for use in shopping carts would have a tire that is a replaceable part. Desirable characteristics include:

- Tire is installable while wheel is connected to the cart frame or caster assembly.
- Tire is able to be removed easily while on cart frame or caster assembly.
- Tire must be secure enough while on wheel to withstand routine operational loads.
- Tire is ideally manufacturable with mass production tooling.
- Removed tire material is ideally able to be directly recycled (i.e. does not contain metal non-removable pins, clips, or other materials that would prevent direct meltdown of tire).
- Design may optionally use special tools to aid in tire installation and or tire removal, but it is beneficial to have an option for removal and installation with standard tools (such as a utility knife, screwdriver, pliers, et cetera) to avoid the absolute requirement of having the special tools available.

Half Rivets to Preclude Roll-Out Separation.

As noted above, the prior art solution of molding a tire to the wheel to cause the tire material to capture the wheel by flowing through holes in the wheel prevents roll-out separation but at the cost of precluding replacement of the tires.

One solution that allows removable tires that engage the wheel to avoid roll-out separation uses push-in half-rivets. FIG. 10 shows a side view of a half-rivet 250. FIG. 11 shows a perspective view showing the outward surface 270 of one half-rivet 252 and the flat inside face 274 of the half-rivet 254 on the opposite side of the wheel (wheel not shown here).

The half-rivet 250 may be simply a shaft 260 with an expanded diameter section (head 262) on top. The head 262 may be frustoconical with a leading portion 266, a tapered portion 264 and a trailing flange 268. As this is a half-rivet, approximately half of the rivet is missing and there is the flat inside face 274. One of skill in the art will appreciate that the inside face does not have to be flat as long as it fits within the rivet through a hole in the wheel and has room relative to the radial face of the wheel.

If the head 262 of the push-in half-rivet 250 is pressed into a passageway in the wheel of similar size and shape to the shaft 260 of the half-rivet 250, the expanded diameter of head 262 will compress to fit in the passageway and will snap back out laterally when the trailing flange 268 of the half-rivet head 262 exits the passageway. Since the expanded diameter of the half-rivet head has a barbed shape with a trailing flange 268, the half-rivet head 262 will resist being pulled back out of the passageway.

FIG. 12 shows cross section of a tire 240 mounted on wheel 300. The hub and bearing assembly (compare 120 in FIG. 1) is not shown in this cross section but there is a center sleeve 304 to receive the hub and bearing assembly.

In this example, there are four pairs of half-rivets that secure the tire 240 to the wheel 300. The cross section shown in FIG. 12 runs through half-rivet 252 and half-rivet 254 at 6 o'clock on the wheel 300. The cross section also runs through half-rivet 220 and half-rivet 224 at 12 o'clock on the wheel 300. In FIG. 12, the half-rivet 290 is visible at 3 o'clock on the wheel 300 but the half-rivet on the back side of the wheel 300 is not. The other half of the wheel 300 would have a set of half-rivets at 9 o'clock on the wheel 300 and the other halves of half-rivets 250, 254, 220, and 224. Those of skill in the art will appreciate that each half-rivet passes through a rivet hole 308 in the wheel 300.

Those of skill in the art will appreciate that the number of pairs of half-rivets does not need to be four. It is possible that it could be less than four but could easily be more than four pairs.

Those of skill in the art will appreciate that the half-rivets could be arranged so that they do not align across the wheel. Thus on one face of the wheel, the half-rivets could be placed at 12, 3, 6 and 9 o'clock and on the opposite face of the wheel the half-rivets could be placed at 1, 3, 5, 7, 9, and 11 o'clock. Note in this example, the number of half-half rivets on the first side of the wheel is not equal to the number of half-rivets on the other side of the wheel. However while many variations are possible, it is likely that the half-rivets will be arranged in pairs on either side of the wheel 300 as shown in FIG. 12.

Tire Joint.

The proposed design uses at least one tire segment. Each place that two tire segment ends meet, there is a seam. Minimizing the discontinuity at the seams is important to avoid having the seams provide a source for noise or vibration as the tires on the wheels are rolled across very smooth floors. Note that rolling across a rough surface such as asphalt is actually less demanding from a performance perspective as customers will expect vibration on the rough surface. The customers will be largely intolerant of noise or vibration coming from the wheel assemblies when rolling the cart wheel assemblies on extremely smooth floors—as are found in many retail establishments.

The seam problems can be divided into peel-up and gapping. Peel-up is when an end of the tire segment peels up away from the wheel. Gapping is when the two tire segments do not peel up, but a noticeable gap appears between the two adjacent tire segments.

T-Tongue End.

FIG. 13 introduces one part of the tire joint. Unlike the tire of the prior art that was molded on the wheel, the present disclosure teaches a tire 240 that is created away from the wheel 300 and then applied to the wheel 300. The joint has two components, a T-tongue 400 shown in FIG. 13 and a groove end 450 discussed in connection with FIG. 14.

FIG. 13 shows a T-tongue 400 with a tongue height 404 that is less than the tire height 408. The T-tongue 400 extending beyond the main portion 412 of the tire 240 forms a T to rest on top of the center ridge 348 of the wheel 300.

The components of the T-tongue 400 extend from the tongue base 416 outward with a T-riser section 420 that covers the wheel center ridge and a wider T-crossbar 424 that extends outward perpendicular to the wheel circumference. The T-tongue 400 has three planes perpendicular to the circumference of the wheel:

1) tongue base 416;
2) T-proximal flange 428 on the side of the T-crossbar 424 facing the tongue base 416; and
3) the T-distal flange 432 on the opposite side of the T-crossbar 424.

Groove End.

Figure 14:
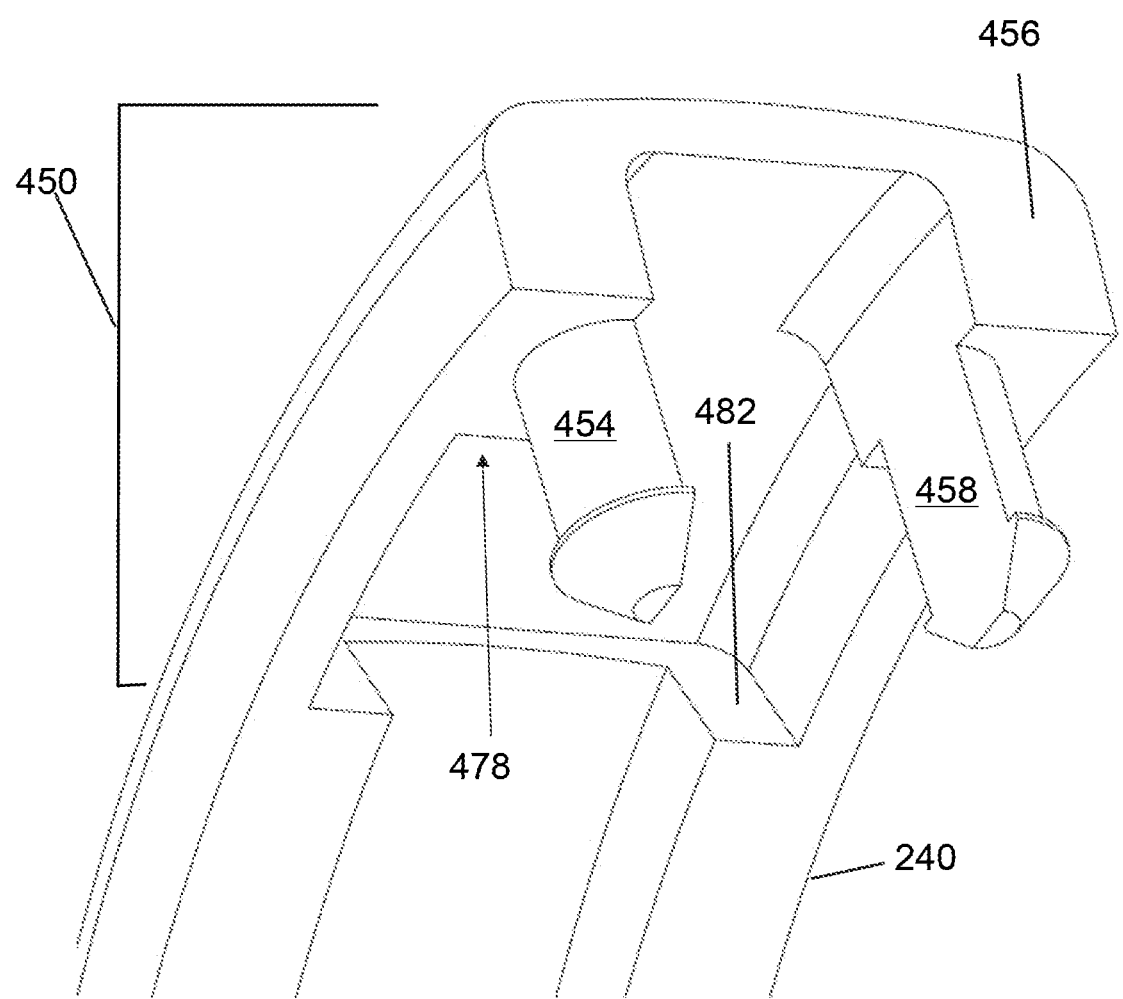
FIG. 14 shows a groove end 450 of a segment of a tire 240 that can mate with the T-tongue 400 of FIG. 13.

FIG. 14 shows a groove end 450 of a segment of a tire 240 that can mate with the T-tongue 400 of FIG. 13. The groove end 450 is adapted to cover the T-tongue 400 and then hold the pair of segment ends (400 and 450) down on the wheel (FIG. 13 300) with a pair of half-rivets 454 and 458 that extend through corresponding passageways in the wheel 300. The groove end 450 has three planes perpendicular to the circumference of the wheel:

1) distal groove flange 456 shaped to be placed adjacent to the tongue base 416;
2) medial groove flange 478 shaped to be placed adjacent to T-proximal flange 428 on the side of the T-crossbar 424 facing the tongue base 416; and
3) proximal groove flange 482 shaped to be adjacent to the T-distal flange 432 on the opposite side of the T-crossbar 424.

One of skill in the art will appreciate that by careful selection of the length of the T-riser section 420 that one could trap the T-crossbar 424 in the groove end 450 of a segment between the medial groove flange 478 and the proximal groove flange 482 so that the T-riser section 420 is in elastic deformation and thus in tension and pulls the distal groove flange 456 towards the tongue base 416 to minimize any gap between the two tire segment ends (400 and 450). The pair of half-rivets (454 and 458) inserted through rivet holes 308 in the wheel 300 prevents the groove end 450 of the one segment and the entrapped T-tongue segment 400 from peel-up.

Installation Process.

The installation process can use one or more tire segments. In order to focus on the wheel and the tire segments, other components such as the hub and bearing assembly or the engagement of the wheel assembly to a cart caster or to a fixed portion of the cart frame are not included in the assembly images.

One of skill in the art will appreciate that as each seam uses a pair of half-rivets to help hold the seam, a wheel and tire assembly having three or more segments would have additional passageways in the wheel for receipt of additional half-rivets at the seams and possibly additional half-rivets at the midpoints between adjacent seams. In an extreme case with many short tire segments, it may be possible to not have a set of half-rivets placed between adjacent seams as the short arcs between adjacent seams may make those half-rivets unnecessary. Conversely, when there are only one or a few tire segments on a large cart wheel assembly, it may be desirable to have more than one pair of half-rivets engage the tire segment to the wheel as shown above in the one tire segment example.

Installation Process—One Tire Segment.

Figure 15:
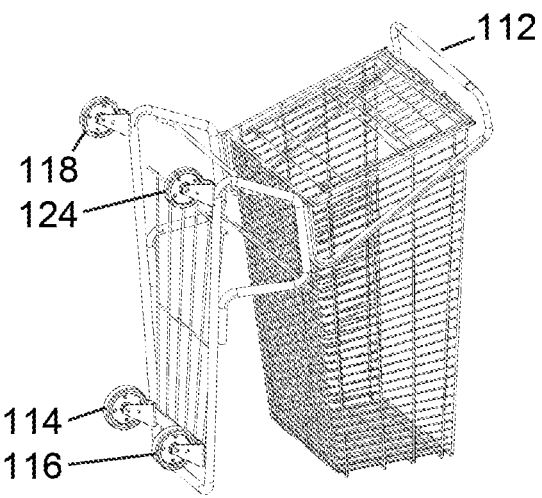
FIG. 15 shows a shopping cart 110 resting with the handle 112 up.

FIG. 15 shows a shopping cart 110 resting with the handle 112 up. The shopping cart 110 may have two wheel assemblies 114 and 116 at the front end of the shopping cart 110 which may turn to allow the cart to be steered. The shopping cart 110 may have two more wheel assemblies 118 and 124 at the back end and not able to rotate to steer the shopping cart 110. Wheel assemblies 118 and 124 do not have tires installed yet.

Figure 16:
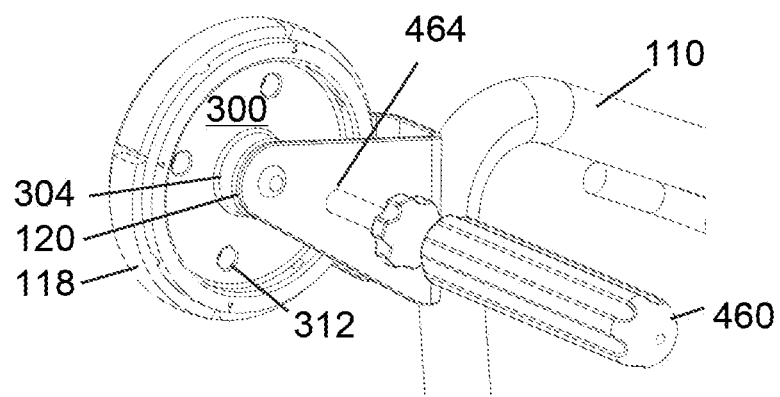
FIG. 16 shows a portion of the shopping cart 110 and wheel assembly 118.

FIG. 16 shows a portion of the shopping cart 110 and wheel assembly 118. Notice that there are a set of through bores 312 in wheel 300. A distal end of a tool 460, such as a Phillips head screwdriver, may be inserted through a hole 464 in the shopping cart 110 shopping cart and through one of the through bores 312 to stop the ability of the wheel 300 to rotate around the hub and bearing assembly 120 located in the center sleeve 304 in the wheel 300. The use of through bores 312 to immobilize the wheel 300 is optional and thus the presence of the through bores 312 in the wheel 300 is optional.

Figure 17:
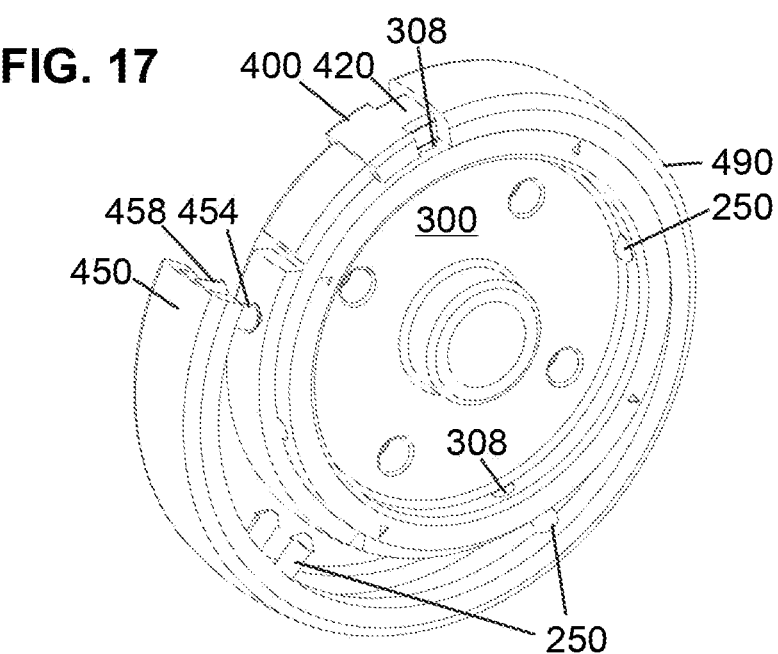
FIG. 17 shows a wheel 300 receiving a single piece tire segment 490 with a T-tongue 400 and a groove end 450.

FIG. 17 shows a wheel 300 receiving a single piece tire segment 490 with a T-tongue 400 as discussed in FIG. 13 and a groove end 450 as discussed in FIG. 14. To allow a focus on the interaction of the single piece tire segment 490 with the wheel 300, no other components are shown in FIG. 17.

One can observe from FIG. 17 that the process is to place the T-riser section 420 between two rivet holes 308. The single piece tire segment 490 is then applied around the circumference of the wheel 300 with the center ridge 348 enveloped by the single piece tire segment 490. The half-rivets 250 are inserted through the rivet holes 308 and retained, with the half-rivets 454 and 458 inserted last to complete the installation.

With appropriate spacing of the half rivets and rivet holes 308, the single piece tire segment 490 could be installed clockwise or counterclockwise on wheel 300 as it is the pairs of half-rivets that engage with the wheel 300 not the T-tongue 400 or the groove end 450.

Returning to FIG. 16, one of skill in the art will appreciate that the tool 460 may be removed from the hole 464 and removed from the through bore 312 and the wheel 300 rotated to allow the user performing installation of the single piece tire segment 490 to position the next set of rivet holes 308 to be engaged with half-rivets to be unobstructed by any portion of the shopping cart 110. After repositioning, the tool 460 may be inserted through the hole 464 and an appropriately located through bore 312 so that the wheel is not able to rotate around the hub and bearing assembly 120.

Installation Process—More than One Tire Segments.

Figure 18:
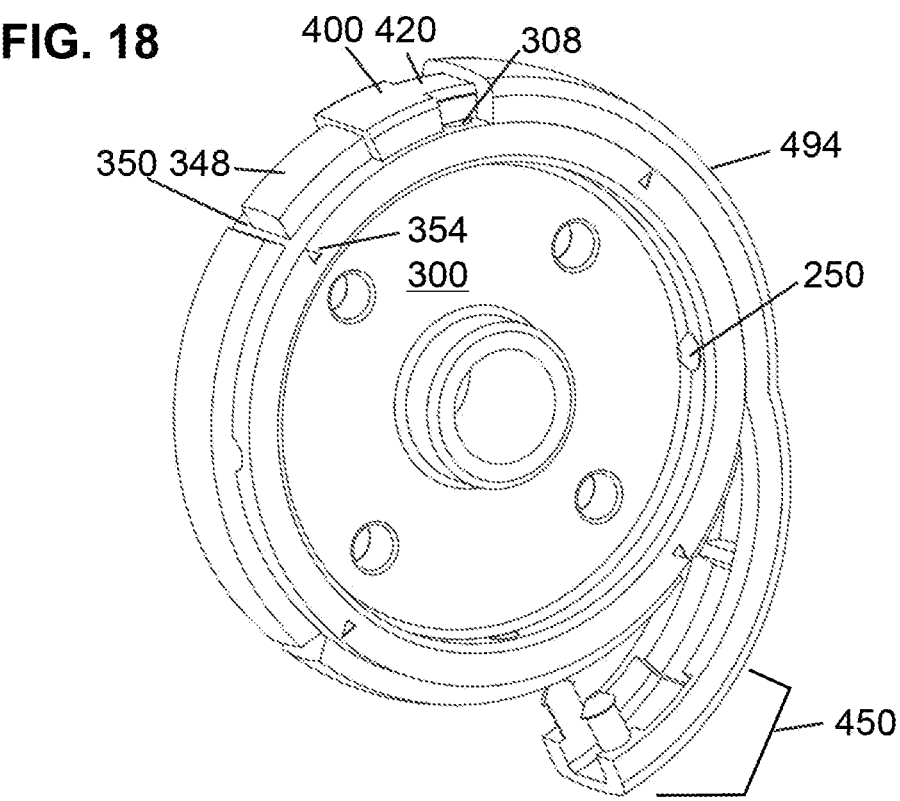
FIG. 18 shows a wheel 300 with a first tire segment 494 having a T-tongue 400 and a groove end 450.

FIG. 18 shows a wheel 300 with a first tire segment 494 having a T-tongue 400 and a groove end 450. As was done above, the T-riser section 420 is placed between two rivet holes 308. The first tire segment 494 is then applied around the circumference of the wheel 300 with the center ridge 348 enveloped by the first tire segment 494. The half-rivets 250 are inserted through the rivet holes 308 and retained. Note that the half-rivets 454 and 458 from the groove end 450 are not immediately inserted as these will be inserted last to complete the installation.

Figure 19:
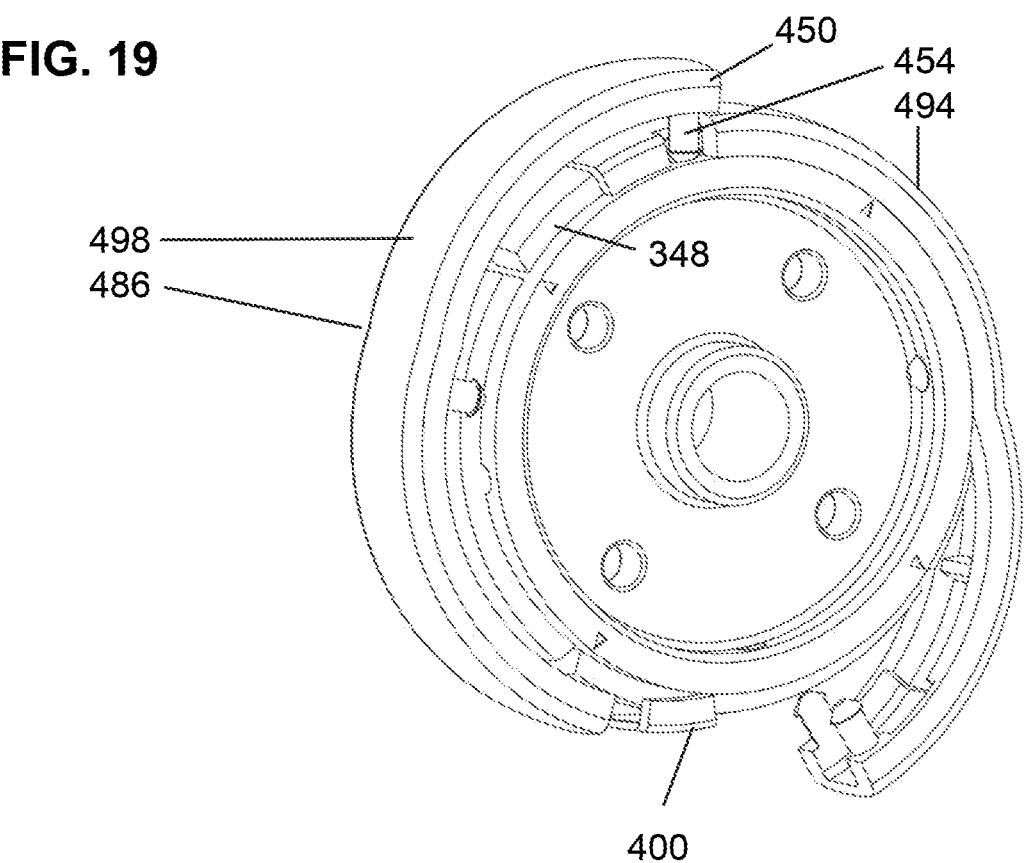
FIG. 19 shows a second tire segment 498 having a T-tongue 400 and a groove end 450.

FIG. 19 shows a second tire segment 498 having a T-tongue 400 and a groove end 450. FIG. 19 differs from FIG. 18 in that groove end 450 of second tire segment 498 is put into position with the insertion of half-rivets 454 and 458 (458 not visible here) to capture the T-tongue 400 of first tire segment 494. The remainder of second tire segment 498 can be inserted over the center ridge 348 of the wheel 300. Note that the second tire segment 498 is sufficiently pliable that it can be bent during the placement process as indicated by inflection point 486.

Figure 20:
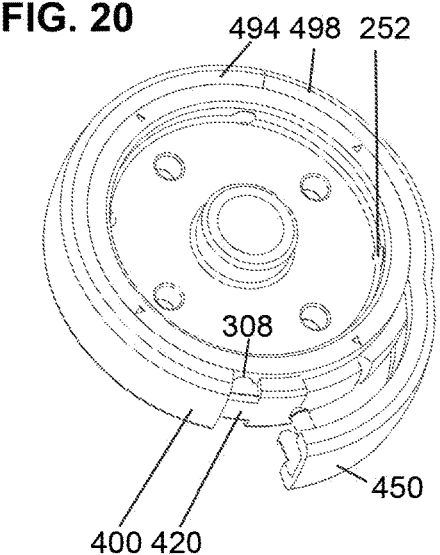
FIG. 20 shows the wheel 300 after the T-tongue 400 of second tire segment 498 is placed on the wheel 300 to place the T-riser section 320 between two rivet holes 308.

FIG. 20 shows the wheel 300 after the T-tongue 400 of second tire segment 498 is placed on the wheel 300 to place the T-riser section 320 between two rivet holes 308. The groove end 450 of the first tire segment 494 was not engaged with the wheel when the first tire segment 494 was applied but is now ready to lock down the T-tongue 400 of the second tire segment 398. Note that first tire segment 494 is sufficiently pliable to allow the groove end 450 to be lifted away from the wheel 300 while portions of the first tire segment 494 are engaged with the wheel 300 through inserted half-rivets 252.

Figure 21:
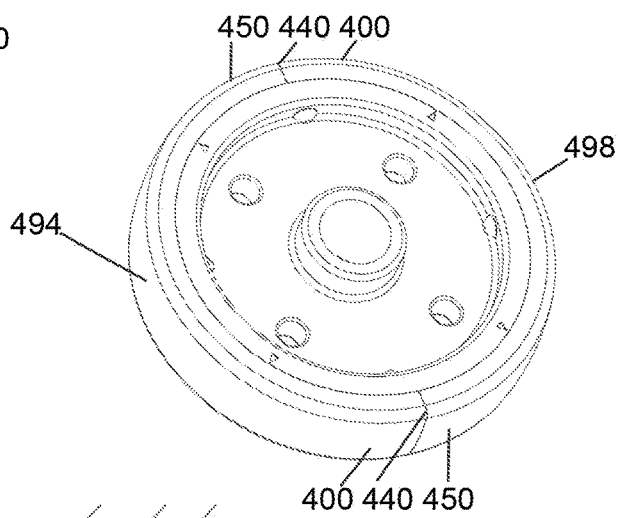
FIG. 21 shows the first tire segment 494 and second tire segment 498 with a pair of seams 440.

FIG. 21 shows the first tire segment 494 and second tire segment 498 with a pair of seams 440. At seam 440, the groove end 450 of the second tire segment 498 holds down the T-tongue 400 of the first tire segment 494. At second seam 440, the groove end 450 of the first tire segment 494 holds down the T-tongue 400 of the second tire segment 498.

One of skill in the art will recognize that the connection of one T-tongue 400 and one groove end 450 of the tire segments could be augmented by the use an adhesive such as Liquid Nails® brand construction adhesives. A small amount of adhesive could be placed on the T-tongue 400 for example to bind the top of the T-tongue 400 to the inside of the groove end 450. The adhesive will not impair the subsequent removal of the tire after end of service as the removal process does not work to undo the joining of the two tire segment ends and the adhesive is placed between tire segments ends 400 and 450 and not between the tire segment (490, or 494 and 498) and the wheel 300.

Tire Removal.

The removal of the one or more tire segments may begin in the same manner as discussed above for tire installation. The shopping cart 110 may be positioned so that the wheel assembly to have the tire removed is accessible (See FIG. 15). A tool 460 may be inserted through a hole 464 in the shopping cart 110 and through one of the through bores 312 to stop the ability of the wheel 300 to rotate around the hub and bearing assembly 120 located in the center sleeve 304 in the wheel 300 (See FIG. 16).

The tire removal process works the same for tires made from one tire segment 490 or from more than one segment such as first tire segment 494 and second tire segment 498.

The set of half-rivet heads 262 of the half-rivets 250 may be cut by inserting a sharp edge 468 (represented here by a utility knife blade) between the flange 268 (See FIG. 10) of the half-rivet 250 and the wheel 300 in order to remove the half-rivet heads 262 of the half-rivets 250 from the shaft 260. Without the flange 268, the shaft 260 is no longer retained by the wheel 300. The order of cutting the half-rivets 250 is not important.

Use of Adhesive and Impact on Tire Removal.

One of skill in the art will recognize that the connection of one T-tongue 400 and one groove end 450 of the tire segments could be augmented by the use of an adhesive such as Liquid Nails® brand construction adhesives. A small amount of adhesive could be placed on the T-tongue 400 for example to bind the top of the T-tongue 400 to the inside of the groove end 450. The adhesive will not preclude the subsequent removal of the tire after end of service as the removal process does not work to undo the joining of the two tire segment ends and the adhesive is placed between tire segments ends 400 and 450 and not between the tire segment (490, or 494 and 498) and the wheel 300.

If an adhesive has been used to adhere a T-tongue 400 to one groove end 450 then in addition to removal of half-rivet heads 262, at least one cut can be made to at least one tire segment. Turning to FIG. 18, one can see that the wheel 300 has a number of transverse notches 350 in the wheel center ridge 348. The location of the transverse notches 350 may be noted by notch indicators 354 on the outsides of the wheel 300, such as the arrowheads used here. The transverse notch 350 allows the sharp edge 468 to cut through the tire segment (490 or 494 and 498) from one side to the other without having to cut around the raised perimeter of the wheel center ridge 348.

Figure 22:
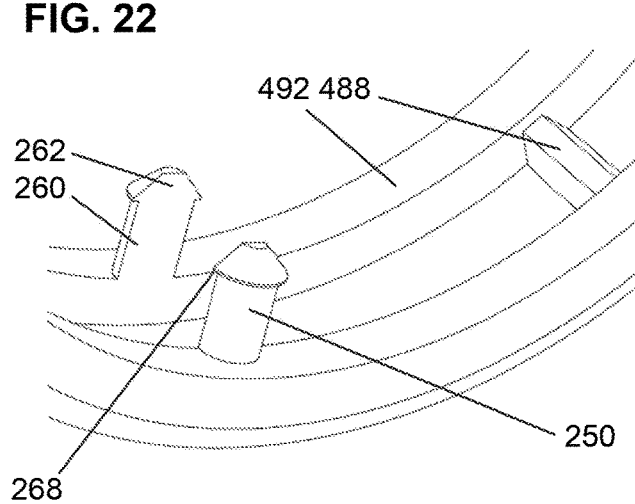
FIG. 22 shows the inner side of a tire segment 492.

As shown in FIG. 22 showing the inner side of a tire segment 492, the tire segment 492 may have a transverse ridge 488 that corresponds to the upper portion of the transverse notches 350 but does not have sufficient height to extend to the bottom of the transverse notches 350 in the wheel 300 in order to facilitate cutting the entirety of the transverse ridge 488 to free the tire segment 492 from the wheel 300.

This wedge shaped transverse ridge 488 would resist any tendency of the tire segment 492 to sag into the transverse notches 350 when the transverse notches 350 is the portion of the tire segment 492 supporting the wheel assembly 100. One of skill in the art could have the wedge shaped transverse ridge 488 that completely fills the transverse notches 350 but any debris left in the transverse notches 350 during installation or manufacturing tolerance excursions could lead to a slight raised portion of the tire segment 492 above a transverse notch 350 and cause a slight vibration. Thus, a wedge shaped transverse ridge 488 that does not extend to the bottom of the transverse notch 350 is preferred.

While the wheel 300 may have several transverse notches 350, only one cut across the tire segment 492 would be required to remove the tire made from one or more segments with adhesive bonded seams from the wheel 300.

One of skill in the art will appreciate that one could cut the tire at a transverse notch 350 before cutting off any or all of the first and then cut off the heads 262 of the half-rivets 250.

The order of the two sets of actions to remove a tire from a wheel 300 is not limited to a specific sequence.

ALTERNATIVES AND VARIATIONS

Segments with Uniform Ends.

One of skill in the art will appreciate that when using an even number of tire segments 494 and 498 instead of having a tire segment with one end having a T-tongue 400 and one groove end 450 as shown above, that one could have one tire segment with both ends as T-tongues 400 that mate with a tire segment with two groove ends 450. Depending on the design, this may require a change in the spacing of passageways in the wheel to receive the half-rivets, but this adjustment would be within reach of one of skill in the art. One of skill in the art will appreciate that there is some advantage for a manufacturing process where each segment is the same as every other segment as this reduces the needs for different molds and inventory requirements to store different types of segments.

Pre-Loaded Half-Rivets.

Those of skill in the art will appreciate the benefit of having half-rivets 250 (See FIG. 22) that are under tension to pull the tire segment (or segment ends at a seam between two ends) towards the wheel 300. A design choice available to increase tension is to size the un-stretched shaft 260 of the half-rivets slightly shorter than the passageway length of the rivet holes 308 through the wheel 300. When the half-rivet head 262 is pressed through a rivet hole 308 in the wheel 300 to allow the trailing flange 268 to extend out of the rivet hole 308 the distance between the trailing flange 268 and the tire end of the shaft 260 will be more than the un-stretched length of the shaft 260 of the half-rivet 250. This stretching of the shaft 260 is at least partially elastic deformation which acts as a stretched spring to hold the tire segment (490, 494, and 498) to the wheel 300.

One of skill in the art will appreciate that pushing the trailing flange 268 of half-rivet 250 sufficiently to stretch the half-rivet shaft 260 may require a tool to focus force on the pushing of half-rivet head 262 through the rivet hole 308 in the wheel 300 by pushing upon the tire segment above the rivet hole 308.

Other Rivet Choices.

Those of skill in the art will appreciate that other rivet shapes could be used instead of the half-rivets 250 used in this disclosure.

Reductions in Wheel Center Ridge Height at Seams.

Optionally, the portion of the center ridge 348 intended to be covered by the T-tongue 400 may be made less tall so that the T-tongue 400 or possibly the thickness of the groove end 450 positioned above the T-tongue 400 (or both) may be made slightly thicker to increase the strength or durability of these segment ends.

Joints with Locking Pins.

The first four figures introduce components on the wheel 500 and tire 600. The interactions with these components will be addressed in specialized figures to follow.

Wheel 500.

FIG. 23 shows a front view of a wheel 500. Wheel 500 has some of the features previously presented with respect to wheel 300. For example, wheel 500 has the optional through bores 516 to use with a tool 460 engaged with a hole 464 (See FIG. 16) to stop the ability of the wheel 500 to rotate around the hub and bearing assembly 120 (See FIG. 1).

FIG. 24 shows a front-top-left side perspective view of the wheel 500 from FIG. 23. FIG. 24 shows center ridge 548 of wheel 500. FIG. 23 and FIG. 24 show male pin bore 520 and first locking pin bore 524 and second locking pin bore 528. These pin bores will be discussed in detail below. FIG. 23 and FIG. 24 show a series of locking grooves 512 and a joint groove 532.

FIG. 25 is a top-front perspective view of a portion of wheel 500 which shows joint portion 550 of the wheel with joint groove 532 and an enlarged view of the male pin bore 520 and first locking pin bore 524 and second locking pin bore 528. The joint portion 550 includes a finger gap 554 which will be described below.

Tire 600.

FIG. 26 shows a front view of tire 600. FIG. 27 shows a front-top-left side perspective view of the tire 600 from FIG. 26. The tire 600 has a male portion 630 and a female portion 660 that are joined to form a seam between the male portion 630 and female portion 660. The tire 600 has a set of locking ribs 612 for placement in the locking grooves 512 in the wheel 500. Visible in FIG. 27 are a first sidewall 604 and a second sidewall 608 that cover the sides of the center ridge 548 of the wheel 500. Components important to forming a joint between the male portion 630 and the female portion 660 are visible in FIG. 26 and FIG. 27 but these components are best introduced by enlarged sections discussed below.

Male Portion 630.

FIG. 28 provides an upward-front perspective view looking up into the male portion 630 of tire 600. FIG. 29 provides a downward-front perspective view looking onto the top surface of the male portion 630 of tire 600.

Female Portion 660.

FIG. 30 provides an upward-front perspective view looking up into the female portion 660 of tire 600. FIG. 31 provides a downward-front perspective view looking onto the top surface of the female portion 660 of tire 600.

Joint Components.

Visible in FIG. 28 and FIG. 29 is locking finger 640 which has: an outward portion 644, a gap 646, and a downward portion 648. The gap 646 separates the joint rib 632 that fits in the joint groove 532 of rim 500 from the downward portion 648 of the locking finger 640. Having a generous gap 646 by placing the joint rib 632 a generous distance away from the face 658 of the male portion 630 affords some leeway when stretching locking finger 640 so that the male portion 630 does not make contact with the female portion 660 and interfere with the insertion of the locking finger 640 into the opening 668. The compression overhang 654, the distance that face 658 extends outward from joint rib 632 can be adjusted so that after insertion—face 658 is compressed tightly against face 688. Having the seam 620 (FIG. 37) in compression helps the prevention of debris entry into the seam 620.

Visible in FIG. 30 and FIG. 31 are components to engage with the locking finger 640. Specifically, there is opening 668 which can receive the downward portion 648 of the locking finger 640. There is also crossbar 676 which fits into gap 646 between the downward portion 648 of the locking finger 640 and the joint rib 632. Face 658 of the male portion 630 is adjacent to face 688 of the female portion 660 when the tire seam is completed.

Male Locking Pin 730.

As will be discussed in detail below, a tire 600 is retained to the wheel 500 at the joint of the male portion 630 and the female portion 660 through the use of two locking pins, a male locking pin 730 and a finger locking pin 760. Looking at FIG. 23 and FIG. 28, the route for the male locking pin 730 (not shown here) may be identified.

The route for insertion of the male locking pin 730 would be:

through first sidewall bore 734 in the male portion 630 of the tire 600;

through male pin bore 520 in wheel 500; and through at least a portion of second sidewall bore 738 in the male portion 630 of the tire 600.

One of skill in the art will appreciate that the route could start with the second sidewall bore 738 and end in the first sidewall bore 734 unless the tire 600 and male locking pin 730 were designed to force a particular sequence.

Finger Locking Pin 760.

Looking at FIG. 28 and FIG. 30 and FIG. 25, the route for the finger locking pin 760 (not shown here) may be identified.

The route for insertion of the finger locking pin 760 would be:

through first sidewall bore 764 in the female portion 660 of the tire 600;

through first locking pin bore 524 in wheel 500;

through finger bore 772 in locking finger 640;

through second locking pin bore 528 in wheel 500; and through at least a portion of second sidewall bore 768 in the female portion 660 of the tire 600.

One of skill in the art will appreciate that the route could start with the second sidewall bore 768 and end in the first sidewall bore 764 unless the tire 600 and finger locking pin 760 were designed to force a particular sequence.

One of skill in the art will appreciate that the joint groove 532 in FIG. 25 could be expanded towards the tip of the finger gap 554 in FIG. 25 so that the wheel 500 does not include a first locking pin bore 524 and a second locking pin bore 528. Using a wheel modified in this way the route for insertion of the finger locking pin 760 would be:

through first sidewall bore 764 in the female portion 660 of the tire 600;

through finger bore 772 in locking finger 640; and through at least a portion of second sidewall bore 768 in the female portion 660 of the tire 600.

While there are advantages to securing the locking finger 640 to the wheel 500 as shown in the various figures, this may not be essential in all uses, particularly if a male locking pin 740 is engaging the male portion 630 of the tire segment to the wheel 500 close to the seam 620 (FIG. 44). Further, an additional locking pin could be placed nearby to engage bores or passageways in the female portion 660 of the seam with the wheel 500 to further stabilize the seam area.

Process of Placing Tire on Wheel.

Figure 32:
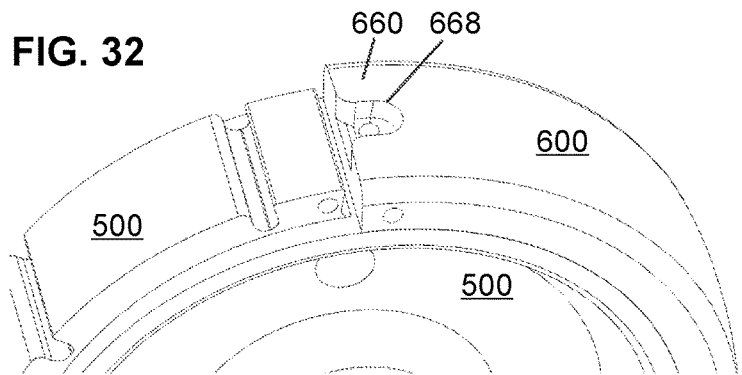
FIG. 32 shows a top-front perspective view of a portion of wheel 500 and tire 600. From this view, one can see the female portion 660 seated on the wheel 500.

FIG. 32 shows a top-front perspective view of a portion of wheel 500 and tire 600. From this view, one can see the female portion 660 seated on the wheel 500.

Figure 33:
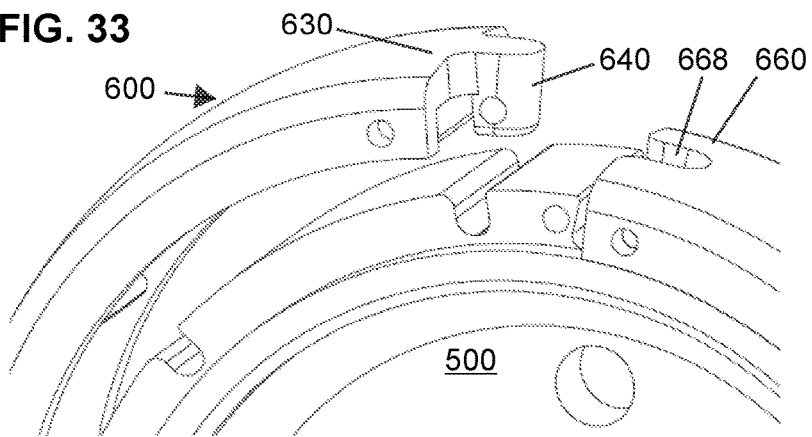
FIG. 33 shows a front-right-top perspective view of a portion of wheel 500 and tire 600.

FIG. 33 shows a front-right-top perspective view of a portion of wheel 500 and tire 600. In FIG. 33 the male portion 630 of the tire is close to the female portion 660 but not yet engaged with the locking finger 640 in the opening 668.

Figure 34:
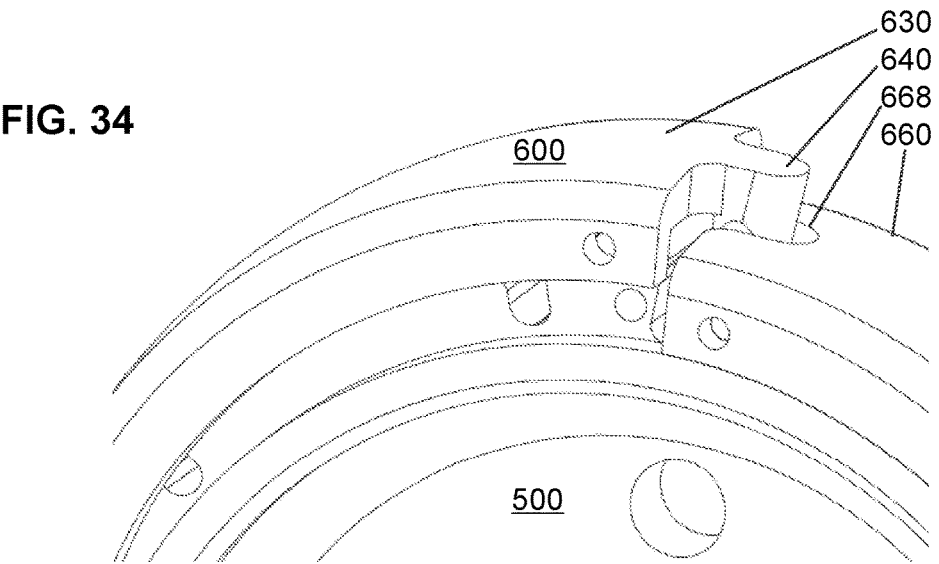
FIG. 34 shows the same front-right-top perspective view of a portion of wheel 500 and tire 600 shown in FIG. 33 but with the locking finger 640 of the male portion 630 beginning to engage with opening 668 in the female portion 660.

FIG. 34 shows the same front-right-top perspective view of a portion of wheel 500 and tire 600 shown in FIG. 33 but with the locking finger 640 of the male portion 630 beginning to engage with opening 668 in the female portion 660.

Figure 35:
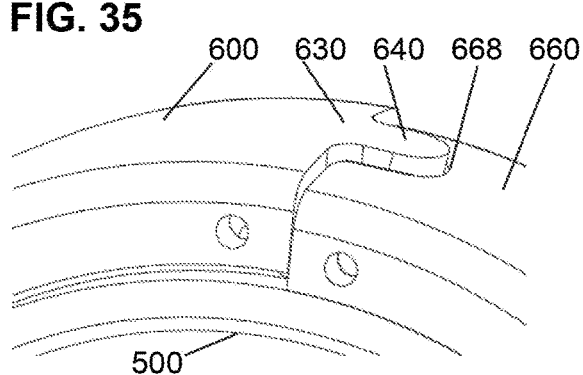
FIG. 35 shows the same front-right-top perspective view of a portion of wheel 500 and tire 600 shown in FIG. 34 but with the locking finger 640 of the male portion 630 almost seated in opening 668 in the female portion 660.

FIG. 35 shows the same front-right-top perspective view of a portion of wheel 500 and tire 600 shown in FIG. 34 but with the locking finger 640 of the male portion 630 almost seated in opening 668 in the female portion 660.

Figure 36:
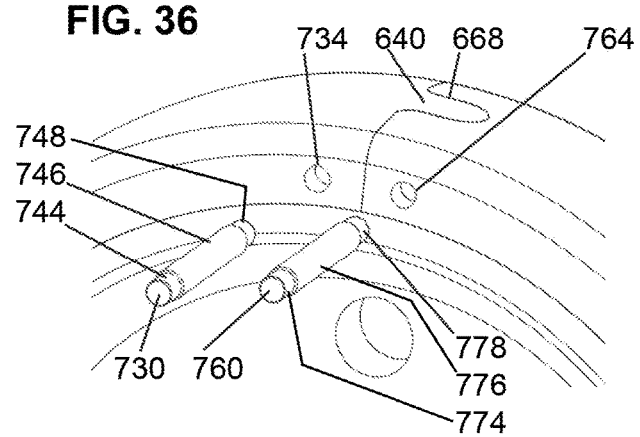
FIG. 36 shows the same front-right-top perspective view of a portion of wheel 500 and tire 600 shown in FIG. 35 but with the locking finger 640 of the male portion 630 fully seated in opening 668 in the female portion 660.

FIG. 36 shows the same front-right-top perspective view of a portion of wheel 500 and tire 600 shown in FIG. 35 but with the locking finger 640 of the male portion 630 fully seated in opening 668 in the female portion 660. Visible in FIG. 36 are male locking pin 730 and finger locking pin 760.

The male locking pin 730 may have segments with different diameters such as first end 744, middle 746, and second end 748. Likewise, the finger locking pin 760 may have segments with different diameters such as first end 774, middle 776, and second end 778. It is not required that the male locking pin 730 be interchangeable with finger locking pin 760. However, those of skill in the art will recognize that there is an advantage in reducing the number of unique parts to build and store in inventory.

The locking pins 730 and 760 do not have to be mirror images on either side of the longitudinal midline, but one of skill in the art will recognize that having a pin with two ends that work in the same manner is a slight advantage. Note that the ends 744, 748, 774, and 778 have a reduced diameter relative to the middles 746 and 776. This allows an end to be relatively easy to insert into the sidewall bores 734, 738, 764 or 768 and then driven with a tool so that the broader middles 746 and 776 can be used to expand the relevant bores and make it unlikely that the locking pins 730 or 760 will come out without a specific effort to remove the pin.

Figure 37:
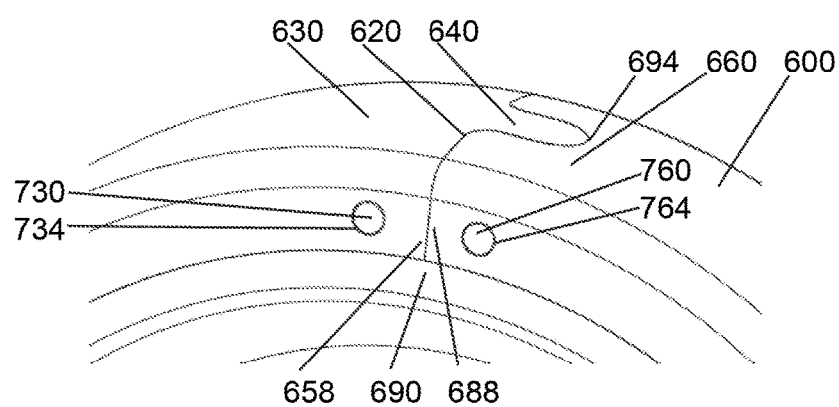
FIG. 37 shows the same front-right-top perspective view of a portion of wheel 500 and tire 600 shown in FIG. 36 but with the male locking pin 730 fully inserted into the first sidewall bore 734 and through the second sidewall bore 738 after passing through the male pin bore 520 in wheel 500 to hold the male portion 630 to the wheel 500.

FIG. 37 shows the same front-right-top perspective view of a portion of wheel 500 and tire 600 shown in FIG. 36 but with the male locking pin 730 fully inserted into the first sidewall bore 734 and through the second sidewall bore 738 after passing through the male pin bore 520 in wheel 500 to hold the male portion 630 to the wheel 500. Likewise, the finger locking pin 760 is fully inserted:

into the first sidewall bore 764 and through the second sidewall bore 768 after passing through the first locking pin bore 524 in wheel 500, the finger bore 772 in locking finger 640, and the second locking pin bore 528 in wheel 500 to lock the locking finger 640 and the female portion 660 to the wheel 500.

To prevent the locking pins 730 and 760 from coming out in use, the locking pins 730 and 760 and corresponding holes in the tire 600 and wheel 500 are designed so the locking pins 730 and 760 have a friction fit and are pressed into the tire 600 and wheel 500. The locking pins 730 and 760 can have multiple diameters and the holes in the tire and wheel could be designed to help to lock the locking pins 730 and 760 in place. For instance, the bores 520, 524 and 528 in the wheel 500 could be 0.125 inches in diameter and the middle sections 746 and 776 of the locking pins 730 and 760 could be slightly smaller than 0.125 inches in diameter, such as 0.124 inches in diameter so that the locking pins 730 and 760 do not need to expand rigid wheel 500.

The diameter of the locking pins 730 and 760 at the ends 744, 748, 774, and 778 could be noticeably small, such as only 0.100 inches in diameter. But the sidewall bores 734, 738, 764 and 768 could be about this same diameter, 0.100 inches. Since the tire 600 is made of a somewhat flexible material, the 0.124 inch middle diameter for section (746 or 776) of the locking pins 730 and 760 could be pressed with some force through the 0.100 in diameter of the sidewall bores 734, 738, 764 and 768 in the tire 600. Those of skill in the art will appreciate that the middle section 766 or 776 would only pass through one sidewall bore 734, 738, 764 and 768 in the tire 600 but the locking pin 730 or 760 could be inserted from the first side or the second side of the tire 600.

Once the locking pin 730 or 760 is fully inserted, the locking pin 730 or 760 will tend to stay in position as considerable force would be required to move the expanded middle section 746 or 776 through any of the smaller diameter sidewall bores 734, 738, 764 and 768 in the tire

600. This removal of the locking pins 730 or 760 would require direct axial force on the locking pins 730 or 760 and this would not happen by accident.

While the interaction of the locking pins 730 or 760 with the tire 600 and wheel 500 as set forth above is desirable, it is not strictly required. Another design that takes advantage of many teachings of the present disclosure could have locking pins with constant diameter but have smaller diameter sidewall bores 734, 738, 764 and 768 in the tire 600 to act to hold the pin in place.

Tire Molding.

In FIG. 37 there is a sidewall seam 690 where face 658 of the male portion 630 is adjacent to face 688 of the female portion 660 of tire 600. Note that the tire 600 starting at face 688 of the female portion 660 of tire 600 all the way around the wheel 500 and back to distal tip 694 of locking finger 640 is more than 360 degrees as the locking finger 640 extends beyond sidewall seam 690. Molding a tire 600 that is more than 360 degrees poses some challenges. One solution is to break the tire 600 into two or more segments as described above and have additional seams.

Figure 39:
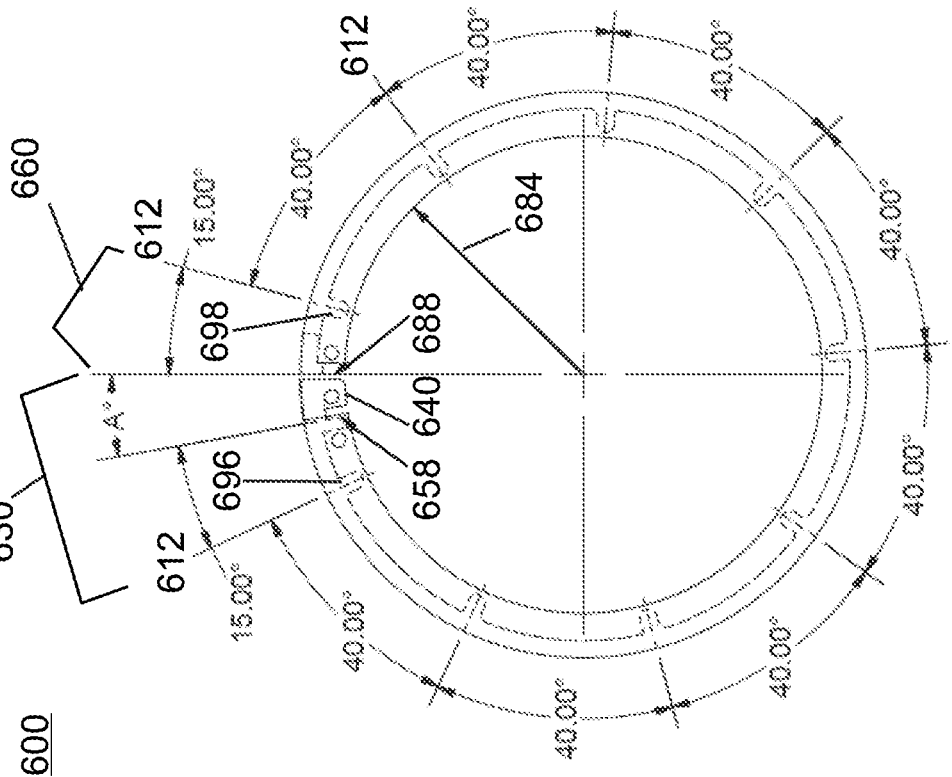
FIG. 39 shows a front view of tire 600 before engagement with the wheel 500.
Figure 38:
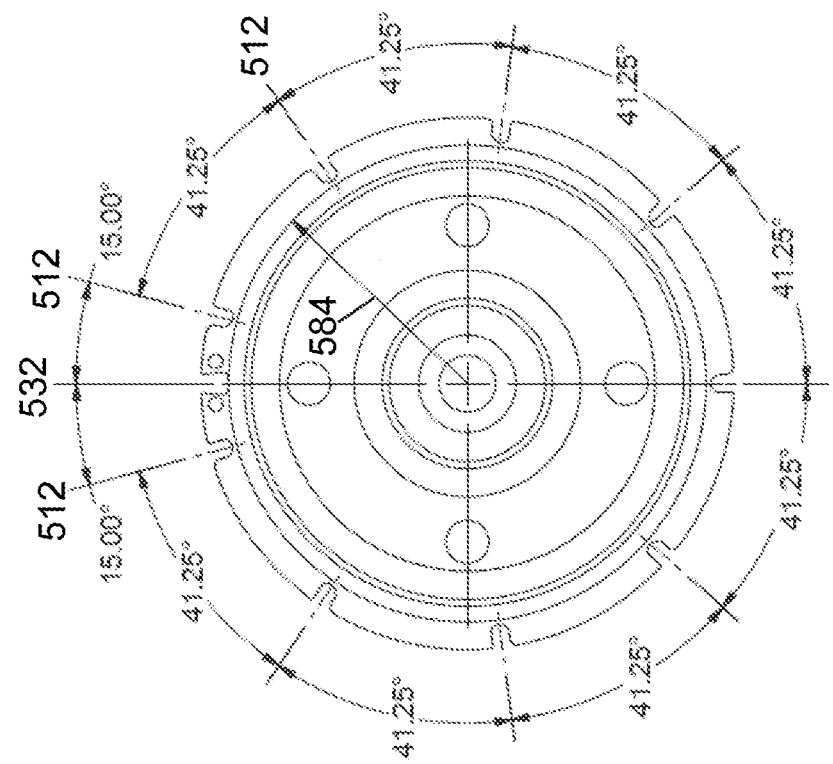
FIG. 38 is a front view of wheel 500 with specifics on the spacing of the locking grooves 512.

FIG. 38 and FIG. 39 illustrate another solution. FIG. 38 is a front view of wheel 500 with specifics on the spacing of the locking grooves 512. Wheel 500 has nine locking grooves 512 spaced at 41.25 degrees. The interactions of the male portion 630 of the tire 600 with the female portion 660 of the tire 600 occur in the 30 degrees between the adjacent locking grooves 512, centered on joint groove 532.

FIG. 39 shows a front view of tire 600 before engagement with the wheel 500. Notice that the distance from the locking rib 612 which is the last male locking rib 696 to the face 658 of the male portion 630 is 15 degrees. Likewise, the distance from the locking rib 612 which is the last female locking rib 698 to the face 688 of the female portion 660 is 15 degrees. The locking finger 640 which extends beyond face 658 of the male portion 630 is identified as length A. If length A is 10 degrees, then by spacing the locking ribs 612 in the tire 600 at 40 degrees rather than the wheel spacing of locking grooves 512 of 41.25 degrees then as the tire 600 is applied to the wheel 500, each segment of tire 600 between adjacent locking grooves 512 of the wheel 500 will be stretched slightly to stretch the locking rib gap of 40 degrees to 41.25 degrees. Eight small stretches of the tire 600 to engage with the wheel 500 stretches the tire 600 to allow the tire 600 to overlap the locking finger 640 with the female portion 660.

Note that much of the small stretch of each segment of tire 600 (1.25/40 is a bit more than 3%) will be achieved as the locking rib 612 moves from the near edge of the locking groove 512 to the centerline of locking groove 512. Thus, the user will not need to provide a large stretch of the tire 600 before attempting to engage the locking groove 512. One of skill in the art will appreciate that adding additional locking grooves 512 and locking ribs 612 can be used to increase the number of small stretches of the tire 600 and thus increase the total stretch of the tire 600.

Note that radius 584 in FIG. 38 can be the same as radius 684 in FIG. 39 so that the sidewalls of the tire 600 have the same radius as the relevant portion of the wheel 500. One could make a tire 600 with a radius 684 less than radius 584 if the installation process would tolerate additional stretching of the tire 600 to fit the wheel 500. Having a tire 600 with a radius 684 significantly more than radius 584 is an alternative to requiring the tire stretch to fit around the wheel. A larger radius 684 could be used to make the length of the arc between 698 and 696 larger so opposing faces 658 and 688 will meet without tire stretch when wrapped around the wheel with smaller radius 584. The downside of this approach is that tire 600 will not grip as tightly to the wheel 500.

Those of skill in the art will appreciate that the specific numbers will vary depending on the angular length of the locking finger 640, the number of locking grooves 512 and the desire to stretch the tire. A designer may wish to have tire stretch that exceeds the length of the locking finger 640.

Other Groove/Locking Rib Combinations.

A designer enjoys some latitude in designing a locking groove (compare 512) and locking rib (compare 612). To note the range of possible locking groove/locking rib combinations FIG. 40, FIG. 41, FIG. 42, and FIG. 43 each show a side view of a partial wheel and a partial tire to show some locking groove/locking rib combinations.

Figure 40:
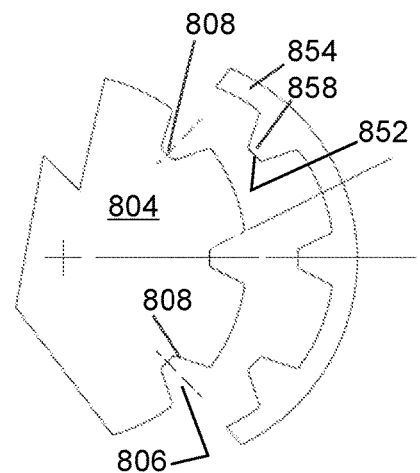
FIG. 40, FIG. 41, FIG. 42, and FIG. 43 each show a side view of a partial wheel and a partial tire to show some locking groove/locking rib combinations.

FIG. 40 shows a segment of a wheel 804 with segment of a tire 854. Each tire locking rib 858 fits into a corresponding sized locking groove 808. As the opening 806 of the locking groove 808 is large relative to the leading end 852 of the locking rib 858, the insertion of the locking rib 858 into a corresponding sized locking groove 808 is relatively easy but is not effective to stretch the tire 854 or to hold the locking rib 858 in the locking groove 808. The choice shown in FIG. 40 may be used when the tire 854 is designed for hardness or thickness and not capable of significant stretch during installation.

Figure 41:
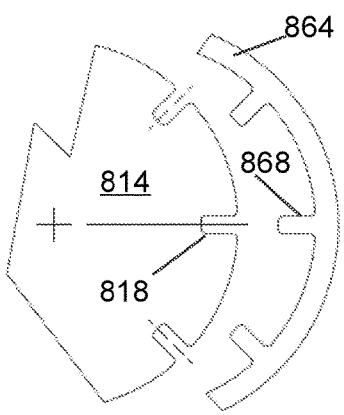

FIG. 41 shows a segment of a wheel 814 with segment of a tire 864. In FIG. 41, the locking rib 868 is the same size as the locking groove 818 but the spacing of locking ribs 868 is smaller than the spacing of the locking grooves 818 so the tire 864 is stretched during installation.

Figure 42:
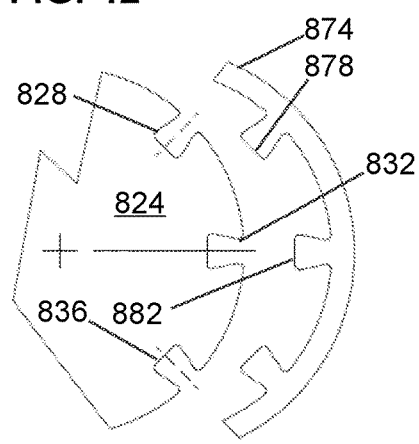

FIG. 42 shows a segment of a wheel 824 with segment of a tire 874. In FIG. 42, the locking rib 878 is the same size as the locking groove 828 but the radially distal end 832 of the locking groove 828 is smaller than the radially proximal end 836 of the locking groove. As the leading surface 882 of the locking rib 878 is the size of the radially proximal end 836 of the locking groove rather than the smaller radially distal end 832 of the locking groove 828, extra force is required to insert the locking rib 878 into the locking groove 828 which tends to help lock the locking rib 878 in the locking groove 828.

Figure 43:
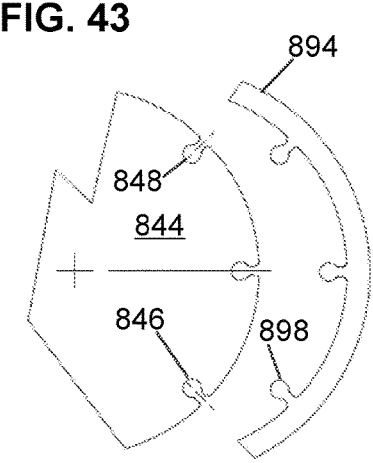

FIG. 43 shows a segment of a wheel 844 with segment of a tire 894. In FIG. 43, the locking rib 898 is the same size as the locking groove 848 but as in the design shown in FIG. 42, extra force will be required to force the locking rib 898 through the small opening 846 of the locking groove 848.

The selection of locking rib and locking groove is partly dependent on the operating environment of the tire and both the thickness and the hardness of the tire material. For example, tires in accordance with the teachings of this disclosure have been made from thermoplastic polyurethane ("TPU"). This class of polymer material is a mix of hard segments and soft segments. By altering the proportion of hard segments to soft segments, one can vary the mechanical properties of the TPU. Thus a design that called for locking ribs to be forced through a narrow opening into the locking groove may benefit from a softer TPU that can allow that temporary change in shape. Likewise, the requirements for the tire portions to stretch between adjacent locking grooves may impact the choice of TPU used so that the tire is capable of the required stretch without making undue demands on the person doing the installation.

Tire Removal.

A tire 600 may be removed from a wheel 500 while the wheel 500 is still attached to the shopping cart 110 (See FIG. 15) while optionally immobilizing the wheel 500 by sticking the distal end of the tool 460 through a hole 464 (See FIG. 15) in a portion of the shopping cart 110 and a through bore 516 in the wheel 500.

FIG. 44 shows that the first step is to remove the locking pins 730 and 760. The removal of the locking pins may start with pressing on the locking pins 730 and 760 on one side of the wheel 500 and then pulling on the locking pins 730 and 760 once they extend out of the tire sidewall on the other side of the wheel 500.

FIG. 45 illustrates the insertion of a distal end 594 of a tool 590 such as an appropriate size flathead screwdriver into the seam 620 (FIG. 44) between the male portion 630 and the female portion 660 of the tire 600. The distal end 594 of the tool 590 may be inserted between the locking finger 640 and the first sidewall 604.

FIG. 46 illustrates a continuation of the process as the distal end 594 of the tool 590 is moved between the locking finger 640 and the second sidewall 608. The process may continue for several iterations until the locking finger 640 is out of the opening 668 in the female portion 660.

Once the locking finger 640 is free of the female portion 660 the male portion 630 may be peeled back from the wheel 500. This process may continue around the perimeter of the wheel 500 until the tire 600 is entirely free of the wheel 500. At this point the wheel 500 can be inspected. If the wheel 500 is suitable for reuse, then a new tire 600 may be applied to the wheel 500 and locked into place with the locking pins 730 and 760 as described above.

ALTERNATIVES AND VARIATIONS

Other Material Choice.

While TPU (thermoplastic polyurethane) has been identified as one possible material for use with the teachings of the present disclosure, other materials will be readily apparent to one of skill in the art after considering the cart environment (abrasion, load weights, need to quiet tire movement, et cetera).

Within TPU, a range of material hardness may be obtained. Tires used in testing the teachings of this disclosure have been produced with a Shore Hardness of 85 A. Shore Hardness is sometimes called Shore durometer or simply durometer. For reference an automotive tire is often in the range of 70 A and the wheels of a skateboard are often in the range of 98 A (per Wikipedia at en.wikipedia.org/wiki/Shore_durometer.)

The locking pins and the wheel may be made from polypropylene. Other dimensionally stable polymers, metals, or other materials may be used.

More than One Tire Segment.

The example showing tire 600 on wheel 500 used one tire segment to cover the wheel 500. The teachings of the present disclosure could be implemented having two or more tire segments to cover the wheel 500. There are some advantages for molding in having each tire segment the same length and each segment having a male portion 630 and a female portion 660 but this is not a strict requirement. A wheel may be covered by a set of tire segments that are not all the same length. Likewise some segments may have a pair of male portions 630 and some segments may have a pair of female portions 660.

Figure 47:
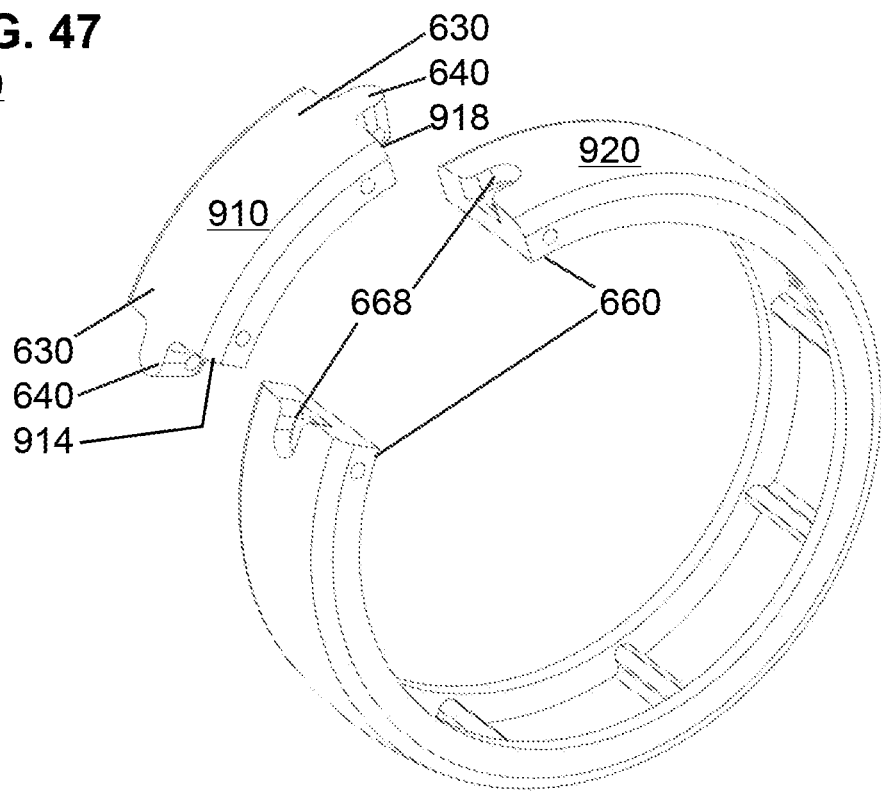
FIG. 47 shows a tire 900 made from a short segment 910 with a pair of male portions 630 with locking fingers 640, one at a first end 914 and one at a second end 918.

FIG. 47 shows a tire 900 made from a short segment 910 with a pair of male portions 630 with locking fingers 640, one at a first end 914 and one at a second end 918. A corresponding long segment 920 has a pair of female portions 660 with openings 668 to receive the locking fingers 640. The seams may be completed with the use of male locking pins 730 and finger locking pins 760 (not shown here) engaging with bores in the wheel and sidewalls as discussed above. One of skill in the art will appreciate that the wheel 500 shown above would need to be modified to accommodate the change in tire seams from the single seam shown in tire 600 with wheel 500.

One of skill in the art can appreciate that there may be more than two tire segments but each pair of adjoining segment ends will need to be joined together and to the wheel.

More than One Locking Finger/Female Portion Opening.

The example set forth above had one locking finger 640 that fit into one opening 668 in the female portion 660 of the tire 600. This is not a requirement to have just one locking finger 640. One of skill in the art can appreciate, particularly for a wider tire, that it may be appropriate to have more than one locking finger 640 and more than one opening 668 to receive the locking finger 640. The wheel would need to be adjusted to allow a locking pin to engage bores in each locking finger 640 to help maintain the seated position of the locking fingers 640.

Figure 48:
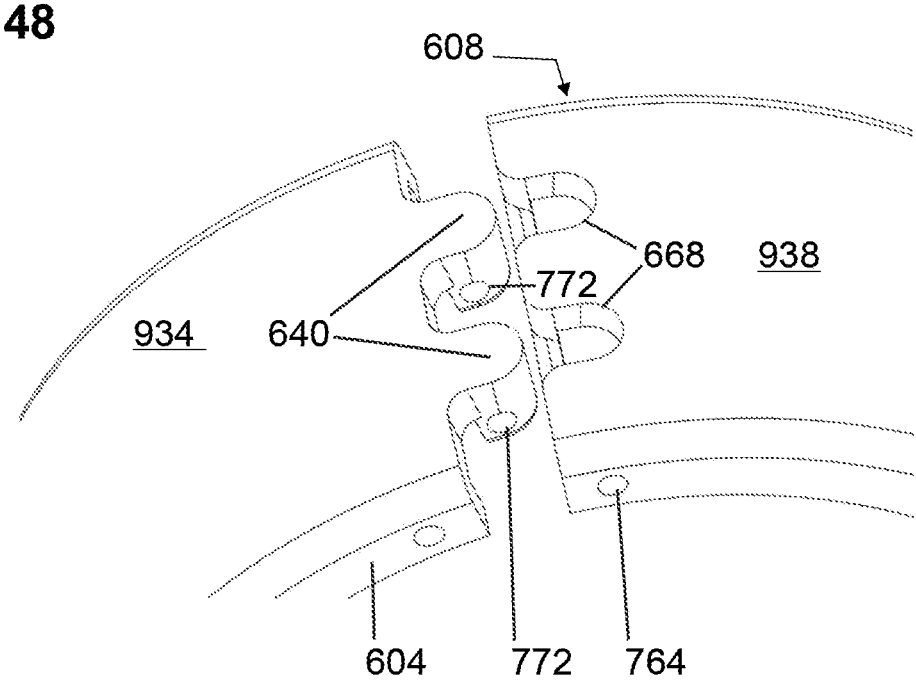
FIG. 48 is a front-top perspective view of a portion of a tire 930 with a male portion 934 with a pair of locking fingers 640.

FIG. 48 is a front-top perspective view of a portion of a tire 930 with a male portion 934 with a pair of locking fingers 640. The tire 930 has a female portion 938 with a pair of openings 668 to receive the pair of locking fingers 640. If the use of the pair of locking fingers 640 and pair of openings 668 is because the face of the tire 930 is broader than the face of tire 600, then the locking pins would need to be scaled to the appropriate size. The finger locking pin may engage bores in the wheel in three places rather than two places as shown in wheel 500. Thus the route for insertion of the finger locking pin would be:

through first sidewall bore 764 in the female portion 938 of the tire 930;
through first locking pin bore in wheel (not shown);
through the first finger bore 772 in first locking finger 640;
through middle locking pin bore in wheel between the two locking fingers 640 (not shown);
through the second finger bore 772 in second locking finger 640;
through final locking pin bore in wheel (not shown); and
through at least a portion of second sidewall bore 768 (not visible here) in the female portion 938 of the tire 930.

Those of skill in the art will appreciate that the terms first sidewall bore and second sidewall bore are terms used to describe the travel of the locking pin entering from a particular side and the travel of the locking pin may from the opposite side thus starting with the second sidewall bore and ending at the first sidewall bore.

Those of skill in the art will appreciate that the concept should be understood as including at least one locking finger. There could be more than two locking fingers, particularly with a wide tire.

Once the concept of a seam with more than one locking finger and corresponding opening is appreciated, one of skill in the art can see that a first tire segment end could have at least one locking finger that extends outward to a second tire segment end to engage with an opening that receives the locking finger. The first tire segment could also have an opening that receives a locking finger extending from the second tire segment end. At least one locking pin would capture and retain a portion of the at least one locking finger from the first tire segment and at least one locking pin would capture and retain a portion of the at least one locking finger from the second tire segment. In this variation, it may not be necessary to have a locking pin analogous to the male locking pin 730 as there would be finger locking pins on both sides of the seam created connecting the first tire segment end to the second tire segment end.

Thus, one can imagine that the segment ends in FIG. 48 could have one locking finger 640 extending left to right as shown and one locking finger 640 extending from right to left (opposite to that shown).

Looking again at the image in FIG. 48, a designer may choose to have a tire segment that has a first locking finger 640 extending from left to right on the half of tire segment adjacent to the first sidewall 604 and not have any locking finger on the half of tire segment adjacent to the second sidewall 608 so that there is a face to face joint on that half of tire seam which is held in place by the actions of the locking pins on each side of the seam. Such a choice is not precluded by the teachings of the present disclosure although in most instances a designer would prefer a symmetric design that minimizes the length of seam away from a locking finger 640.

Bores.

The present disclosure shows locking pins that are cylindrical and bores that are round. While these choices may be the most common, the teachings of the present disclosure do not strictly require round choices. A locking pin could have a triangular, square or other shape and engage with openings in the tire and wheel that correspond to the shape of the locking pin. Those of skill in the art will recognize that non-round shapes can increase stresses at the corners but this may be compensated for. A designer may choose to place a locking pin of a first shape in a passageway of a second shape. For example, a round locking pin could be placed in a passageway that is triangular, square, or oblong providing that the pin can be driven through the passageway.

Locking Finger Could Extend Radially Outward.

The examples discussed in this disclosure show locking fingers that extend along the circumference of the tire and then substantially radially downward into a gap in the wheel. This design works well, but a designer may choose to have a locking finger that extends along a gap in the center ridge of the wheel and then extends upward through a corresponding opening in the female portion of the seam to form the upper surface of the tire. A finger locking pin would engage the lower portion of the locking finger with the wheel and the sidewalls of the female portion of the seam. One of skill in the art will appreciate that having a locking finger that extends radially outward through an opening in the female portion of the seam will make it expedient to set the male portion of the seam in place before placing the female portion of the seam on top of the locking finger.

Figure 50:
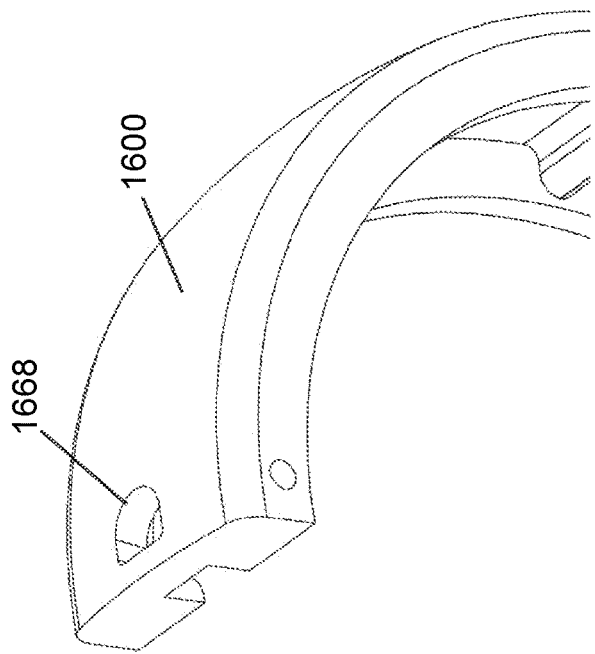
FIG. 50 provides an upward-front perspective view looking up into the female portion 1660 of tire 1600.
Figure 49:
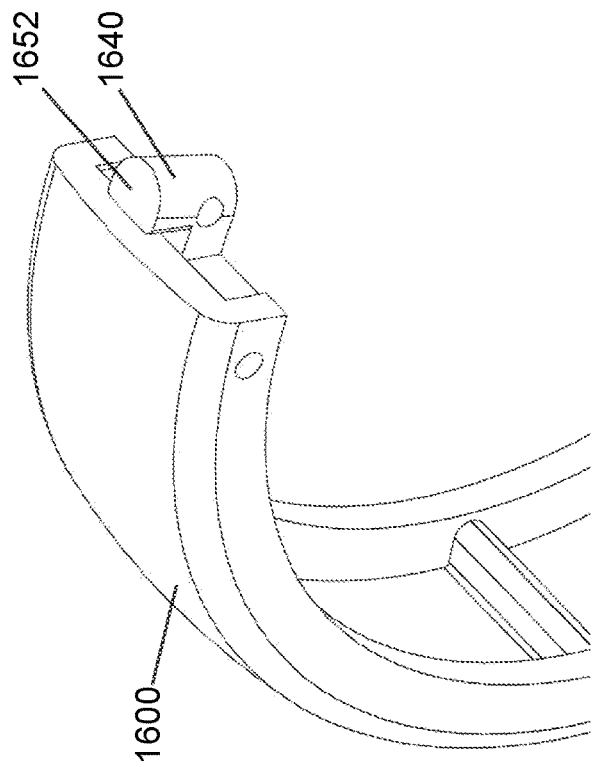
FIG. 49 provides an upward-front perspective view looking up into the male portion 1630 of tire 1600.

An example of this alternative orientation can be found in FIG. 49 and FIG. 50 which can be compared with FIG. 29 and FIG. 31. FIG. 49 provides an upward-front perspective view looking up into the male portion 1630 of tire 1600. FIG. 49 includes a distal tip 1652 at the end of a locking finger 1640 which extends radially outward from where the tire 1600 would rest on the wheel.

FIG. 50 provides an upward-front perspective view looking up into the female portion 1660 of tire 1600. FIG. 50 includes an opening 1668 which can receive the distal tip 1652 of the locking finger 1640.

Locking Finger Could Lack a 90 Degree Bend.

The examples discussed in this disclosure show locking fingers that extend along the circumference of the tire and then substantially radially downward into a gap in the wheel. This design works well, but a designer may choose to have a locking finger that extends along a gap in the center ridge of the wheel and does not have a 90 degree bend. A finger locking pin would engage a distal portion of the locking finger with the wheel and the sidewalls of the female portion of the seam. One of skill in the art will appreciate that having a locking finger that extends linearly into an opening in the female portion of the seam may require insertion of the distal portion of the locking finger into a proximal end of the opening in the female portion before the male portion and the female portion are seated upon the wheel. The tire segment ends will need to be sufficiently flexible to accommodate this process.

No Limit on Uses for Carts.

While the present disclosure described a particular type of cart well-known by readers—a shopping cart—there is no intent to limit the scope of the claims to a cart used by someone doing shopping. There are many carts used for carrying a variety of loads from mail carts to carry mail within a facility to go-karts to allow children to coast down a hill. Any wheel that uses a non-pneumatic tire around a wheel could benefit from the teachings of the present disclosure. Thus, wheels may be found in medical, industrial, commercial, residential, academic, or other types of facilities in addition to wheels used on items that are used outdoors.

Other Wheels.

While the most common use of the teachings of the present disclosure are for wheels on carts, the teachings of the present disclosure may be used for wheels that are in a fixed location such as rollers for an assembly belt or drive wheels that are used in amusement park rides to drive items such as flume ride cars.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above. There was no attempt to exhaustively recite all possible sequence permutations as the objective was to simply provide enablement of the process steps to one of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of applying a tire to a wheel, the method comprising:
   forming a tire seam with:
      a first seam end having at least one locking finger that extends beyond a first seam face, the first seam end having a first seam end first sidewall and a first seam end second sidewall that cover at least a portion of a center ridge that extends along at least a portion of a circumference of the wheel; and
      a second seam end having at least one opening to receive the at least one locking finger through a second seam face, the second seam end having a second seam end first sidewall and a second seam end second sidewall that cover at least a portion of the center ridge;
   inserting the at least one locking finger into the at least one opening; and
   inserting a finger locking pin to engage:
      a first passageway in the second seam end first sidewall,
      a second passageway in the second seam end second sidewall, a third passageway through a distal portion of the locking finger, and
      at least one fourth passageway through the wheel; and
   wherein after inserting the finger locking pin:
      the first seam end and second seam end are substantially continuous on an outer circumference of the tire;
      the first seam end and second seam end are substantially continuous at the first seam end first sidewall and the second seam end first sidewall covering at least the portion of the center ridge; and
      the first seam end and second seam end are substantially continuous at the first seam end second sidewall and the second seam end second sidewall covering at least the portion of the center ridge.

2. The method of claim 1 further comprising placing a second locking pin to engage:
   a passageway in the first seam end first sidewall;
   a passageway in the first seam end second sidewall;
   and at least one passageway through the wheel.

3. The method of claim 1 wherein inserting the at least one locking finger into the at least one opening includes inserting a distal tip of the at least one locking finger radially inward towards a center of the wheel through the at least one opening.

4. The method of claim 1 wherein inserting the at least one locking finger into the at least one opening includes inserting a distal tip of the at least one locking finger radially outward away from a center of the wheel through the at least one opening.

5. The method of claim 1 wherein:
   the first seam end has more than one locking finger that extends beyond the first seam face;
   the second seam end has more than one opening to receive the more than one locking finger; and
   the finger locking pin engages a passageway through a portion of each of the more than one locking finger.

6. The method of claim 1 further wherein:
   the second seam end has at least one locking finger that extends beyond the second seam face; and
   the first seam end has at least one opening to receive a locking finger behind a first seam face; and
   after inserting the at least one locking finger from the second seam end into the at least one opening in the first seam end, inserting a second finger locking pin to engage:
      a passageway in the first seam end first sidewall;
      a passageway in the first seam end second sidewall;
      a passageway through a portion of the locking finger extending from the second seam end; and
      at least one passageway through the wheel.

7. The method of claim 1 wherein a single tire segment with a single seam covers the circumference of the wheel.

8. The method of claim 1 wherein a portion of the locking finger must be stretched in order to insert the at least one locking finger into the at least one opening.

9. A method of applying a tire to a wheel, the method comprising:
   obtaining a wheel having:
      a center ridge that extends along at least a portion of a circumference of the wheel;
      a joint groove;
      a set of at least two locking grooves, and
      at least one passageway to receive a locking pin to secure a tire seam formed by a first seam end and a second seam end;
   obtaining a tire segment having:
      the first seam end having:
         at least one locking finger that extends beyond a first seam face;
         a first joint rib for insertion into a first side of the joint groove; the first joint rib offset from the first seam face by a compression overhang;
         a first seam end first sidewall that covers at least a portion of the center ridge; and
         a first seam end second sidewall that covers at least a portion of the center ridge;
      the second seam end having:
         at least one opening to receive a portion of the at least one locking finger behind a second seam face,
         a second joint rib for insertion into a second side of the joint groove, adjacent to the first joint rib;
         a second seam end first sidewall that covers at least a portion of the center ridge; and
         a second seam end second sidewall that covers at least a portion of the center ridge;
   inserting either the first joint rib or the second joint rib into the joint groove;
   placing the tire segment on the circumference of the wheel including:
      placing a set of locking ribs on an inner side of the tire into the set of at least two locking grooves, wherein placing a set of locking ribs into the set of at least two locking grooves requires a stretch of the tire so that at least one tire segment portion between adjacent locking grooves is in tension after the set of locking ribs are placed into adjacent locking grooves;
      forming a tire seam involving the first seam end and the second seam end with the locking finger extending beyond the first seam end and engaging the at least one opening behind the second seam face while compressing the compression overhang of the first seam face as the first joint rib and the second joint rib are now both in the joint groove; and
   after inserting the at least one locking finger into the at least one opening, inserting a finger locking pin to engage:
      a passageway in the second seam end first sidewall;
      a passageway in the second seam end second sidewall;

a passageway through a portion of the locking finger, and at least one passageway through the wheel;

such that the tire segment is locked to the wheel and the first seam face is compressed against the second seam face.

10. The method of claim 9 wherein forming the tire seam involving the first seam end and the second seam end such that the tire segment is locked to the wheel and the first seam face is compressed against the second seam face produces a seam with:

the first seam end and second seam end that are substantially continuous on an outer circumference of the tire;

the first seam end and second seam end are substantially continuous at the first sidewall; and the first seam end and second seam end are substantially continuous at the second sidewall;

such that the tire seam is substantially continuous to reduce an opportunity for ingress of debris into a gap between the first seam end and the second seam end.

11. The method of claim 9 further comprising placing a second locking pin to engage:

a passageway in the first seam end first sidewall;

a passageway in the first seam end second sidewall;

and at least one passageway through the wheel.

12. The method of claim 9 wherein inserting the at least one locking finger into the at least one opening includes inserting a distal tip of the at least one locking finger radially inward towards a center of the wheel through the at least one opening.

13. The method of claim 9 wherein inserting the at least one locking finger into the at least one opening includes inserting a distal tip of the at least one locking finger radially outward away from a center of the wheel through the at least one opening.

14. The method of claim 9 wherein:

the first seam end has more than one locking finger that extends beyond the first seam face;

the second seam end has more than one opening to receive the more than one locking finger; and the finger locking pin engages a passageway through a portion of each of the more than one locking finger.

15. The method of claim 9 further wherein:

the second seam end has at least one locking finger that extends beyond the second seam face; and the first seam end has at least one opening to receive a locking finger behind a first seam face; and after inserting the at least one locking finger from the second seam end into the at least one opening in the first seam end, inserting a second finger locking pin to engage:

a passageway in the first seam end first sidewall;

a passageway in the first seam end second sidewall;

a passageway through a portion of the locking finger extending from the second seam end; and at least one passageway through the wheel.

16. The method of claim 9 wherein a single tire segment with a single seam covers the circumference of the wheel.

17. The method of claim 9 wherein a portion of the locking finger must be stretched in order to insert the at least one locking finger into the at least one opening.

18. A method for disengaging a seam at a joint between two tire ends for a tire covering a wheel, the method comprising:

pressing on a first end of a first locking pin at a first tire sidewall to force a second end of the first locking pin to extend outward from a second tire sidewall;

wherein outward is defined as moving away from a median plane that bisects the wheel from a bottom of the wheel that would contact a floor surface to a top of the wheel 180 degrees from the bottom of the wheel;

removing the first locking pin from engagement with the wheel and a locking finger;

pressing on a first end of a second locking pin at the first tire sidewall to force a second end of the second locking pin to extend outward from a second tire sidewall, the second locking pin not engaged with the locking finger so that a second seam end is no longer engaged with the wheel by the first locking pin; and disengaging the locking finger extending from a first seam end from an opening in the second seam end such that the first seam end is disengaged from the second seam end.

19. The method of claim 18 wherein disengaging the locking finger occurs by pulling the locking finger radially outward from a central axis of the wheel.

20. The method of claim 18 wherein disengaging the locking finger occurs by pulling a second seam end radially outward from a central axis of the wheel to move the opening in the second seam end radially outward from the central axis of the wheel.

* * * * *